(12) United States Patent
Fischer et al.

(10) Patent No.: US 7,647,367 B2
(45) Date of Patent: Jan. 12, 2010

(54) APPARATUS AND METHOD FOR CALCULATING A MULTIPLICATION

(75) Inventors: Wieland Fischer, Munich (DE);
Jean-Pierre Seifert, Hillsborough, OR (US); Holger Sedlak, Sauerlach (DE)

(73) Assignee: Infineon Technologies AG, Neubiberg (DE)

( * ) Notice: Subject to any disclaimer, the term of this patent is extended or adjusted under 35 U.S.C. 154(b) by 916 days.

(21) Appl. No.: 11/166,645

(22) Filed: Jun. 23, 2005

(65) Prior Publication Data

US 2006/0010192 A1    Jan. 12, 2006

Related U.S. Application Data

(63) Continuation of application No. PCT/EP03/13426, filed on Nov. 28, 2003.

(30) Foreign Application Priority Data

Dec. 23, 2002  (DE) ................. 102 60 655

(51) Int. Cl.
*G06F 7/38* (2006.01)
*H04K 1/00* (2006.01)
(52) U.S. Cl. .................. 708/491; 380/28
(58) Field of Classification Search ......... 708/491; 380/28–30
See application file for complete search history.

(56) References Cited

U.S. PATENT DOCUMENTS 4,870,681 A * 9/1989 Sedlak .................. 380/30

| | | | |
|---|---|---|---|
| 6,920,473 B2 * | 7/2005 | Elbe et al. ............ | 708/492 |
| 7,120,660 B2 * | 10/2006 | Elbe et al. ............ | 708/491 |
| 7,426,529 B2 * | 9/2008 | Elbe et al. ............ | 708/490 |

FOREIGN PATENT DOCUMENTS

| DE | 36 31 992 A1 | 11/1987 |
|---|---|---|
| DE | 36 31 992 C2 | 11/1987 |
| DE | 101 07 376 A1 | 8/2002 |
| DE | 101 11 987 A1 | 9/2002 |
| JP | 08-249161 | 9/1996 |
| WO | WO 02/067108 A2 | 8/2002 |

OTHER PUBLICATIONS

Sedlak, H.; "The RSA Cryptography Processor"; Lecture Notes in Computer Science, Springer Verlag, New York, NY, US, vol. 304, 1988, pp. 95-105; XP000617561.

* cited by examiner

*Primary Examiner*—Chuong D Ngo
(74) *Attorney, Agent, or Firm*—Dickstein Shapiro LLP

(57) ABSTRACT

An apparatus for calculating a modular multiplication includes an examiner for examining digits of the multiplier with a lookahead algorithm to obtain a multiplication shift value. In addition, a determinator and intermediate-result shift value are provided which determine a positive intermediate-result shift value. A calculator for calculating a multiplicand shift value as the difference between the intermediate-result shift value and the multiplication shift value. The intermediate result from the preceding iteration step as well as the multiplicand are then shifted by the corresponding shifting magnitudes to then perform a three-operands addition with the shifted values, if need be while considering lookahead parameters.

25 Claims, 19 Drawing Sheets

N: FIXED IN THE REGISTER (LEFT-JUSTIFIED)
C, Z: VARIABLY SHIFTABLE

LSB AT THE BEGINNING OF THE CALCULATION

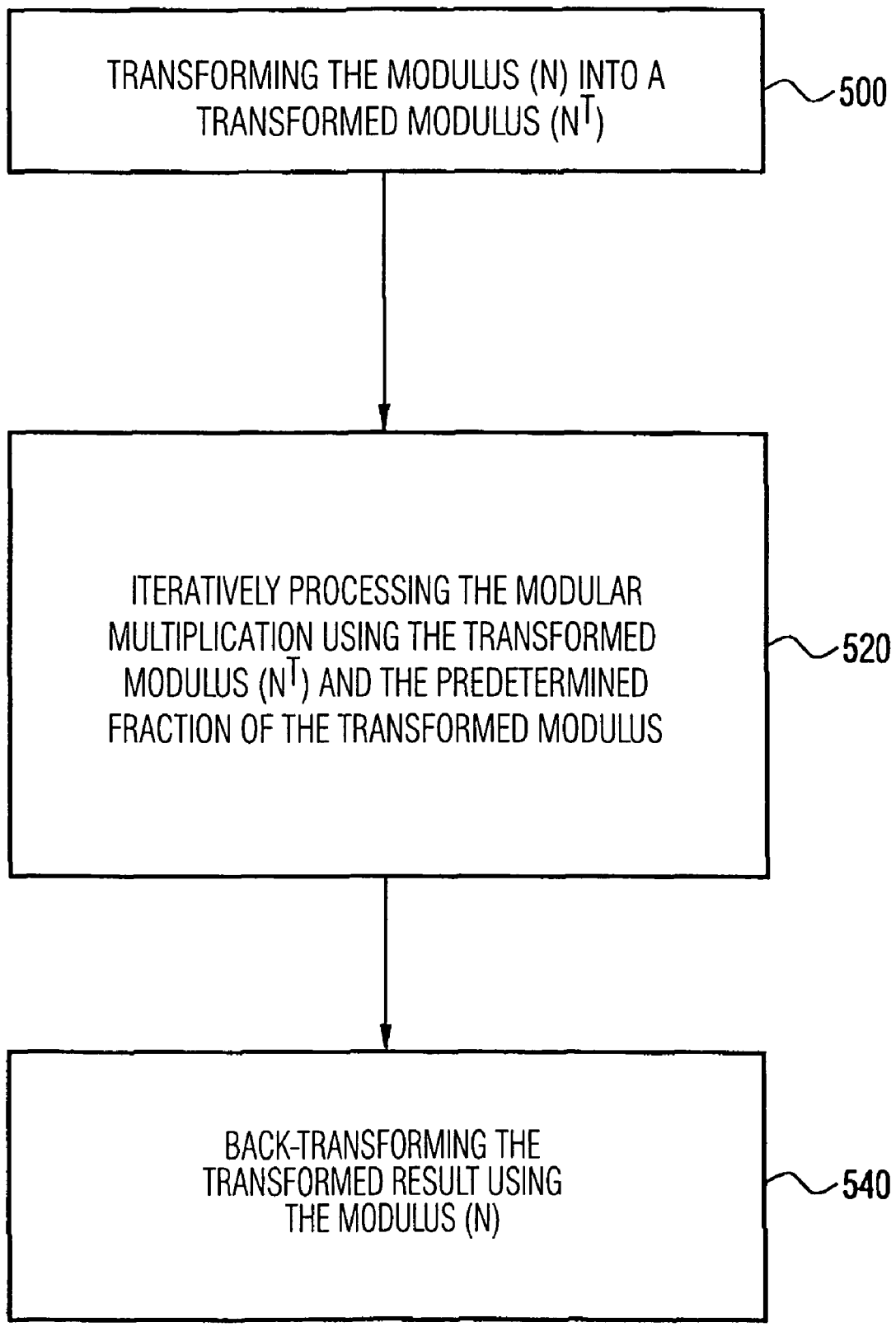

FIG 6 (MODULUS)
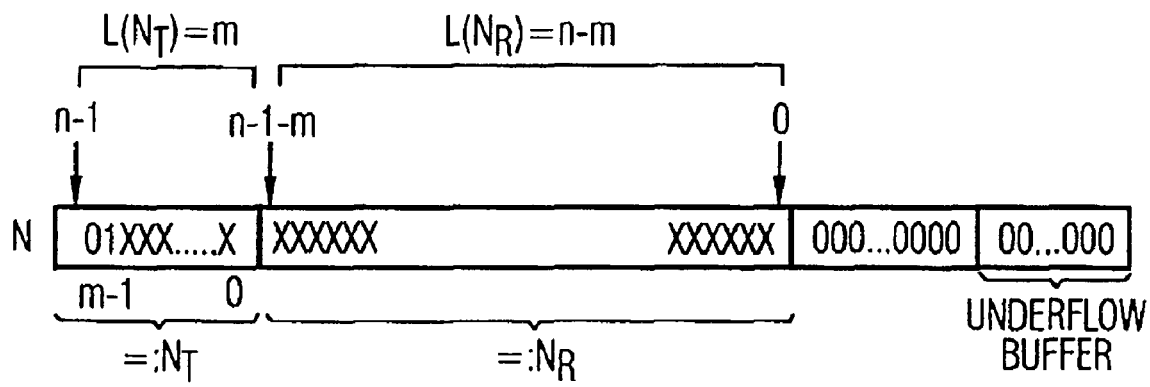
FIG 7 (TRANSFORMED MODULUS)
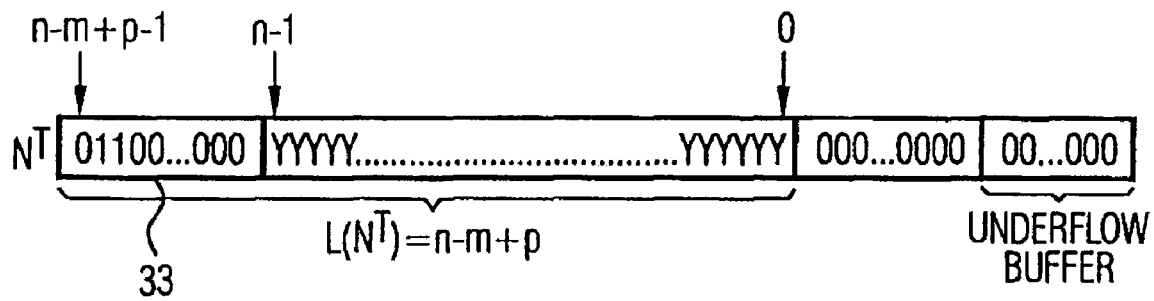
FIG 8 ($\frac{2}{3}N^T$)
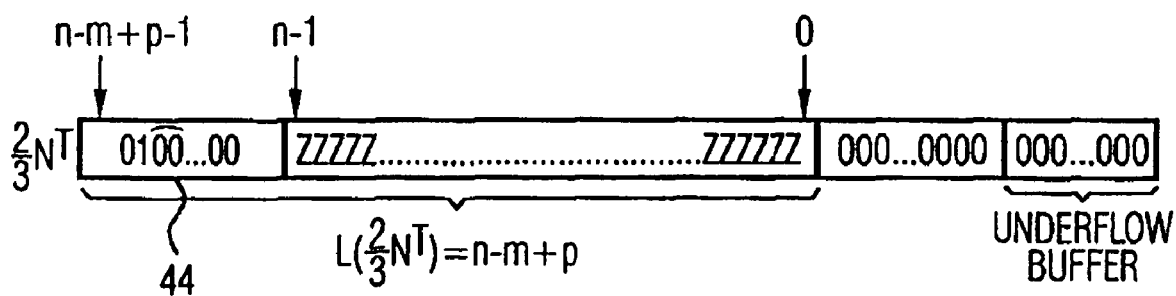

FIG 9 (TRANSFORMED MODULUS WITH RANDOMISATION)
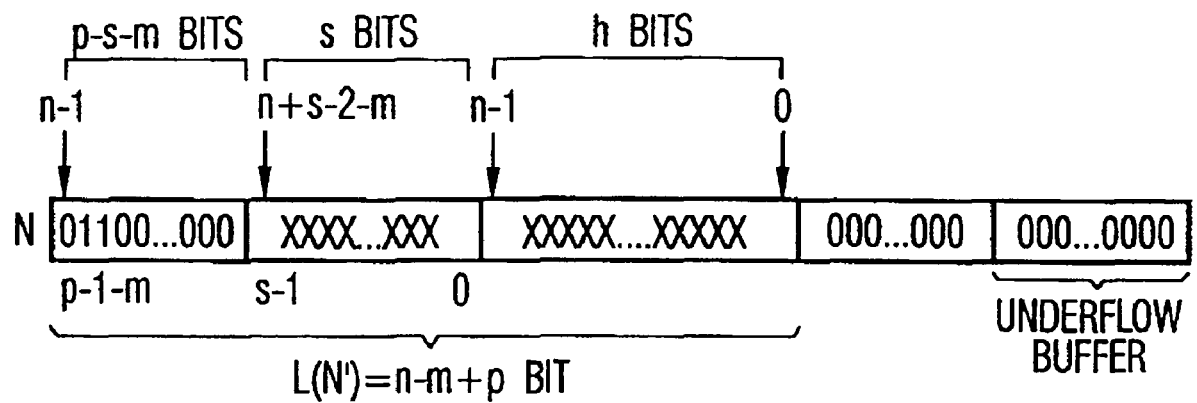
FIG 10
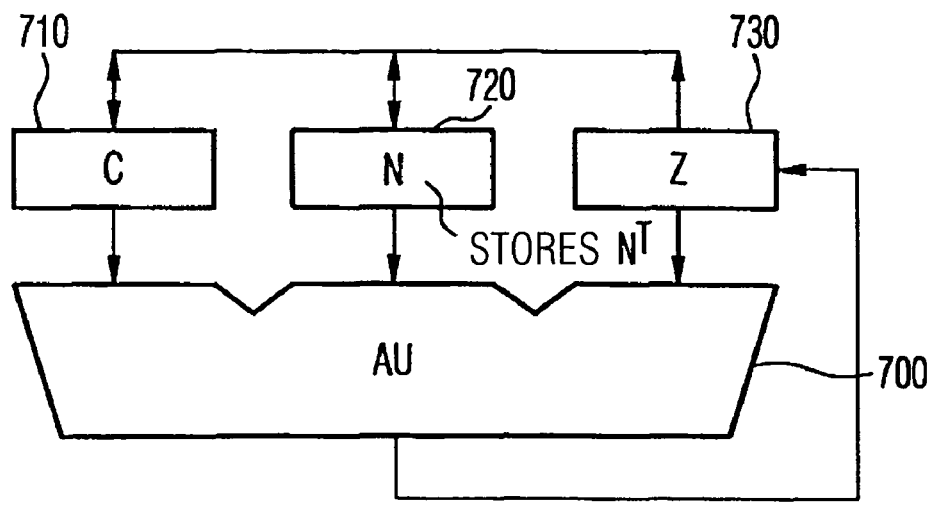

FIG 12

```
var
    Csh                 : integer;
    Zsh                 : integer;
    NoZeros             : integer;
    HaxRegBitLength     : integer;
    NoTopBits           : integer;
    Debug               : integer;

Csh                 := 3;
    Zsh                 := 5;
    NoZeros             := Csh + Zsh;
    HaxRegBitLength     := 160;
    NoTopBits           := NoZeros+4;
    Debug               := 1;
end;
```

FIG 13

```
(*********************************************************)
(*Auxiliary functions*)
(*********************************************************)

function ReturnBit(X, i: integer): integer
begin
        if i >= 0 then
                return ((X div (2**i)) mod 2);
        else
                return 0;
        end;
end:

function SetBit(var X: integer: i, value: integer)
begin
        if (value<0) or (value>1) then
                writeln("Error at SetBit: Value not 1 or 0!")
        end;
        X :=    ( (X div (2**(i+1))) * (2**(i+1)) +
                  value * (2**i) +
                  ( X mod (2**i) )           );
end;

function Bitlength(X: integer): integer
var
        i: integer;
begin
        i := 0;
        while (X>0) do
                X       := X div 2;
                i       := i+1;
        end;
        return i:
end;
```

FIG 14AA

```
(******************************************************************)
(*ZDN - Modular Multiplication*)
(******************************************************************)

function MultMod(C, M. N: integer): integer
external
        (***** Constants *****)
        Csh              : integer ;
        Zsh              : integer ;
        NoZeros          : integer ;
        MaxRegBitLength           : integer ;
        NoTopBits        : integer ;
        Debug            : integer ;
var
        (*****State of the Calculating Unit *****)
        Z        : integer;
        ApproxZ  : integer;
        Lsb      : integer;
        cur_Lsb  : integer;
        LAccu    : integer;
        c        : integer;
        (*****Determination Variables for 3 Operand Addition***** )
        VZ_C     : integer;
        VZ_N     : integer;
        s_Z      : integer;
        s_C      : integer;
        (*****Determination Variables for Multiplication*****)
        m        : integer;
        LA       : integer;
        s_M      : integer;
```

FIG 14AB

```
begin
    if C>=N then
            writeln("Error: C>=N");
    end;
    (*****Adjustment*****)
    LAccu := BitLength(M)+l;
    Lsb := MaxRegBitLength - 1 - BitLength(N);
    if Lsb<9 then
            writeln("Error: N too big")
    end;
    N       := N * (2**Lsb);         6 Adjustment
    C       := C * (2**Lsb);         7 ("Error: N too big")
    (***** Initialisation *****)     8 Initialisation
    Z       := 0;
    ApproxZ := Z;
    c       := 0;
    VZ_C    := 0;
    VZ_N    := 0;
    s_Z     := 0;
    s_C     := 0;
    s_M     := 0;
    m       := LAccu;
    cur Lsb := Lsb;
    LA      := ReturnBit(M. MaxRegBitLength-1);
```

FIG 14B

```
(*****Modular Multiplication*****)
while ( (m>0) or (c>0) ) do
        LAModulo(ApproxZ, N, c, s_Z, VZ_N);
        Postprocessing_LAModulo(s_Z, VZ_N, c, m);

LAMultiplication(M, m, cur_Lsb, s_Z, s_M, LA, VZ_C);
        Postprocessing_LAMultiplication(s_M, s_C, s_Z, VZ_N);

Shift(C, s_C);

ApproxZ := (Z div(2**(MaxRegBitLength-1-NoTopBits)))*(2**(MaxRegBitLength-1-NoTopBits)
        ThreeOperandAddition(Z, s_Z, VZ_C, C, VZ_N, N);

m       := m - s_M;
        c       := c - s_C;
        cur_Lsb := cur_Lsb + s_C;
end;

if (ReturnBit(Z, MaxRegBitLength-1) = 1) then
        ThreeOperandAddition(Z, 0, 0, 0, 1, N);
end;

Z       := Z div (2**Lsb);
return Z;
end;
```

FIG 15

(***ThreeOperandAddition***)

function ThreeOperandAddition(var Z: integer; s_Z. VZ_C. C. VZ_N. N: integer)
external
     MaxRegBitLength    : integer;
begin
     Z := ( Z * (2**s_Z) + VZ_C * C + VZ_N * N ) mod (2**MaxRegBitLength);
end;

function Shift(var X: integer; s_X: integer)
begin
     if (s_x>=0) then
         X    := X*(2**s_X);
     else
         X    := X div (2**(-s_X));
     end;
end:

FIG 16A (***LA Modulo***)

function LAModulo(Z, N , c : integer; var s_Z, VZ_N : integer)
external
      MaxRegBitLength    : integer;
      Zsh               : integer;
      NoTopBits      : integer;
var
      VZ      : integer;
      cur_Zsh : integer;
      i       : integer;
begin
      cur_Zsh := min(Zsh, c);
      (***Approximative 3-Op-Add***)
      N     := (N div (2**NoTopBits)) * (2**NoTopBits);
      Z     := ThreeOperandAddition(Z, s_Z, 0, 0, VZ_N, N);

(*** 0-1-Searcher ***)
      VZ     := ReturnBit(Z, MaxRegBitLength-1);
      s_Z    := 0;
      VZ_N   := 2*VZ - 1;
      while ( (VZ=ReturnBit(Z, MaxRegBitLength-2-s_Z)) and (s_Z<cur_Zsh) ) do
           s_Z   := s_Z+1;
      end;

if (VZ=ReturnBit(Z, MaxRegBitLength-2-s_Z)) then
          s_Z := cur_Zsh;
          VZ_N := 0;
      end;
end;

FIG 16B

```
function Postprocessing_LAModulo(var s_Z, VZ_N : integer; c, m : integer)
external
        NoZeros        : integer;
begin
        if ( (c< =NoZeros) and (m>0) and (s_Z>0) ) then
                s_Z        : = 0;
                VZ_N       : = 0;
        end;
end;
```

FIG 17A (***LA Multiplication***)

function LAMultiplication(M, m, cur_Lsb, s_Z: integer; var s_M, LA, VZ_C : integer)
external
        Csh : integer;
var
        cur_Csh : integer;
begin
        cur_Csh := min(cur Lsb, Csh);
        s_M    := 0;
(***0-1-Searcher***)
        while ( (LA=ReturnBit(M,m-1)) and (s_M<(cur_Csh+s_Z)) and (m>0) ) do
                s_M    := s_M + 1;
                m    := m - 1;
        end;

if    ( (LA=ReturnBit(M,m-1)) ) then
                VZ_C   := 0;
elsif ( not(LA=ReturnBit(M,m-1)) and not(LA=ReturnBit(M,m-2)) ) then
                VZ_C   := 1 - 2*LA;
                LA     := 1 - LA;
elsif ( not(LA=ReturnBit(M,m-1)) and (LA=ReturnBit(M,m-2)) ) then
       if (s_M=cur_Csh+s_Z) then
                VZ_C   : = 0;
       else
               VZ_C    := 1 - 2*LA;
              s_M    := s_H + 1;
       end;
    end;
end;

FIG 17B

```
function Postprocessing_LAMultiplication(s_M : integer; var s_C, s_Z, VZ_N : integer)
external
        Csh     : integer;
begin
        s_C     := s_Z - s_M;

if (s_C>Csh) then
                s_C     := Csh;
                s_Z     := s_C + s_M
                VZ_N    := 0;
        end;
end;
```

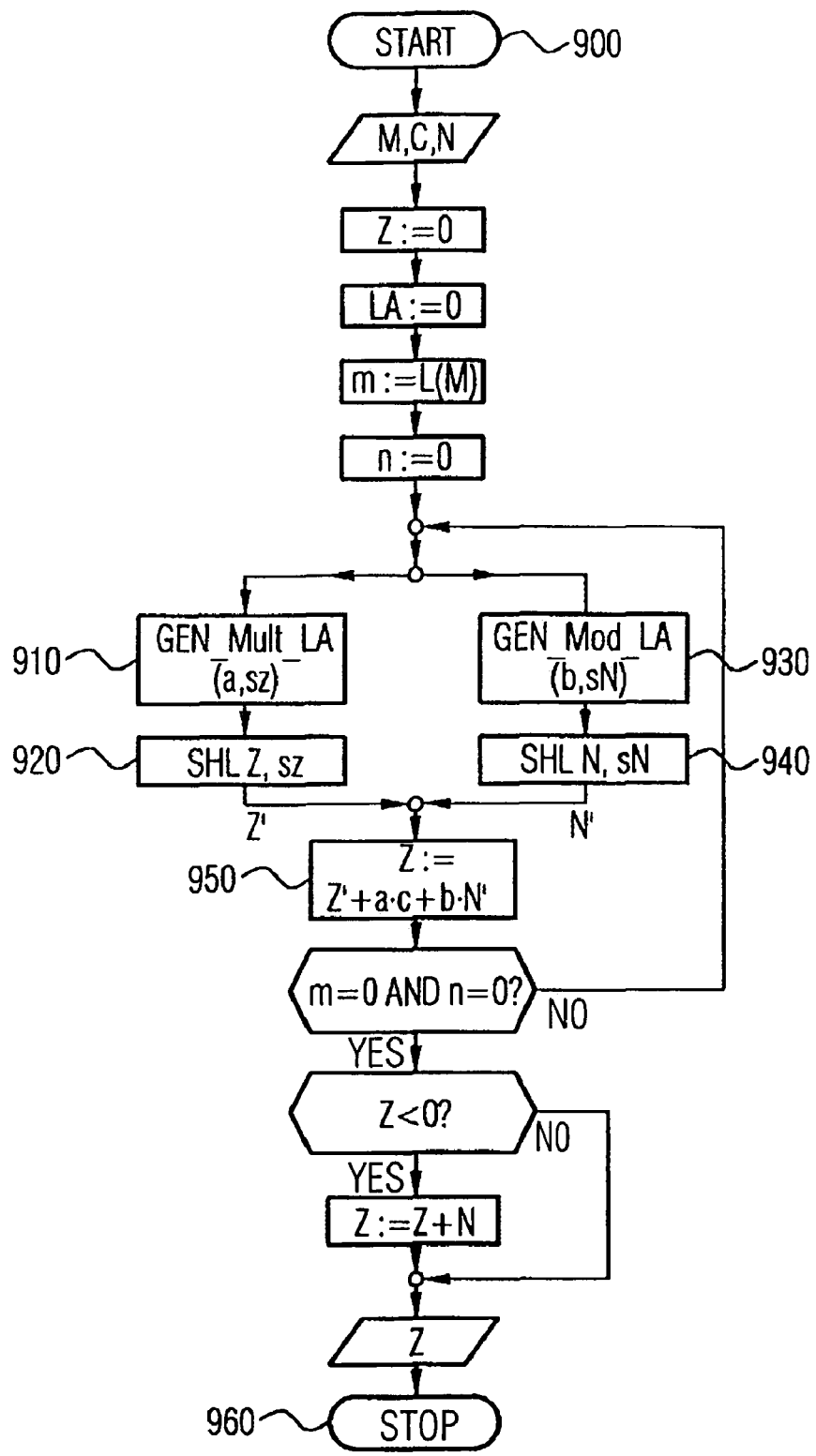

APPARATUS AND METHOD FOR CALCULATING A MULTIPLICATION

CROSS-REFERENCE TO RELATED APPLICATION

This application is a continuation of co-pending International Application No. PCT/EP2003/013426, filed Nov. 28, 2003, which designated the United States and was not published in English and is incorporated herein by reference in its entirety.

BACKGROUND OF THE INVENTION

1. Field of the Invention

The present invention relates to cryptography and, in particular, to concepts for calculating a multiplication of a multiplier and a multiplicand with regard to a modulus within a cryptographic calculation, the multiplier, the multiplicand and the modulus being parameters of the cryptographic calculation.

2. Description of the Related Art

Cryptography is one of the major applications for modular arithmetic. An essential algorithm for cryptography is the known RSA algorithm. The RSA algorithm is based on a modular exponentiation which may be represented as follows:

$$C = M^d \bmod (N).$$

Here, C is an encrypted message, M is a non-encrypted message, d is the secret key, and N is the modulus. The modulus N is usually created by multiplying two prime numbers p and q. The modular exponentiation is split into multiplications by means of the known square-and-multiply algorithm. To this end, the exponent d is split into powers of two, so that the modular exponentiation may be split into several modular multiplications. In order to be able to implement the modular exponentiation efficiently in terms of computation, the modular exponentiation is therefore split into modular multiplications, which may then be split into modular additions.

DE 3631992 discloses a cryptography method wherein modular multiplication may be accelerated using a multiplication-lookahead method and using a reduction-lookahead method. The method described in DE 3631992 C2 is also referred to as a ZDN method and will be described in more detail with regard to FIG. 18. After a starting step 900 of the algorithm, the global variables M, C and N are initialized. The aim is to calculate the following modular multiplication:

$$Z = M*C \bmod N.$$

M is referred to as the multiplier, where C is referred to as the multiplicand. Z is the result of the modular multiplication, whereas N is the modulus.

Hereupon, different local variables are initialized, which need not be explained in further detail. Subsequently, two lookahead methods are applied. In the multiplication-lookahead method GEN_MULT_LA, a multiplication shift value $s_z$ as well as a multiplication-lookahead parameter a are calculated using different lookahead rules (910). Hereupon, the current content of the Z register is subjected to a left-shift operation by $s_z$ digits (920).

Essentially in parallel therewith, a reduction-lookahead method GEN_Mod_LA (930) is performed to calculate a reduction shift value SN and a reduction parameter b. In step 940, the current content of the modulus register, i.e. N, is shifted to the left and right, respectively, by $S_N$ digits so as to create a shifted modulus value N'. The central three-operands operation of the ZDN method takes place in step 950. Here, the intermediate result Z' is added, after step 920, to multiplicand C, which is multiplied by the multiplication-lookahead parameter a, and to the shifted modulus N', which is multiplied by the reduction-lookahead parameter b. Depending on the current situation, the lookahead parameters a and b may have a value of +1, 0 or −1.

A typical case is for the multiplication-lookahead parameter a to be +1, and for the reduction-lookahead parameter b to be −1, so that the multiplicand C is added to a shifted intermediate result Z', and so that the shifted modulus N' is subtracted therefrom. a will have a value equal to 0 if the multiplication-lookahead method allows more than a preset number of individual left shifts, i.e. if $s_Z$ is larger than the maximum admissible value of $s_Z$, which is also referred to as k. In the event that a equals 0 and that Z' is still fairly small due to the preceding modular reduction, i.e. to the preceding subtraction of the shifted modulus, and that Z' is, in particular, smaller than the shifted modulus N', no reduction need take place, so that parameter b equals 0.

Steps 910 to 950 are performed for such time until all digits of the multiplicand have been processed i.e. until m equals 0, and until a parameter n also equals 0, which parameter indicates whether the shifted modulus N' is even larger than the original modulus N, or whether further reduction steps must be performed by subtracting the modulus from Z despite the fact that all digits of the multiplicand have already been processed.

Eventually it will also be determined whether Z is smaller than 0. If this is so, modulus N must be added to Z so as to achieve a final reduction, so that eventually the correct result Z of the modular multiplication is obtained. In a step 960, the modular multiplication by means of the ZDN method is terminated.

The multiplication shift value $s_Z$ as well as the multiplication parameter a, which are calculated by means of the multiplication-lookahead algorithm in step 910, result from the topology of the multiplier as well as from the lookahead rules used which are described in DE 3631992 C2.

The reduction shift value $S_N$ and the reduction parameter b are determined, as is also described in DE 3631992 C2, by comparing the current content of the Z register with a value 2/3×N. The name of the ZDN method is based on this comparison (ZDN=Zwei Drittel N=two thirds of N).

The ZDN method, as is depicted in FIG. 18, traces the modular multiplication back to a three-operands addition (block 950 in FIG. 18), wherein the multiplication-lookahead method and, hand in hand therewith, the reduction-lookahead method, are used for increasing the calculating-time efficiency. Therefore, an advantage in terms of calculating time may be obtained as compared with the Montgomery reduction.

The reduction-lookahead method, which is performed in block 930 of FIG. 18, will be explained below in more detail with reference to FIG. 19. Initially, in a block 1000, a reservation for the local variables, i.e. for the reduction-lookahead parameter b and the reduction shift value $S_N$, is performed. In a block 1010, the reduction shift value $S_N$ is initialized to zero. Hereupon, the value ZDN, which equals 2/3 of modulus N, is calculated in a block 1020. This value which is determined in block 1020 is stored on the crypto-coprocessor on a register of its own, i.e. the ZDN register.

It is then determined, in a block 1030, whether the variable n equals 0, or whether the shift value $S_N$ equals −k. k is a value defining the maximum shift value specified by the hardware. In the first run, block 1030 is answered by NO, so that in a block 1040, parameter n is decremented, and so that in a block 1060, the reduction shift value is also decremented by 1. Then, in a block 1080, the variable ZDN is redefined, i.e. is defined as half its value, which may readily be achieved by a right-shift of the value found in the ZDN register. It is then established, in a block 1100, whether the absolute value of the current intermediate result is higher than the value found in the ZDN register.

This comparative operation performed in block 1100 is the central operation of the reduction-lookahead method. If the question is answered with YES, the iteration is terminated, and the reduction-lookahead parameter is defined, as is represented in block 1120. If, however, the question to be answered in block 1100 is answered with NO, an iterative backward jump is performed to examine the current values of n and $S_N$ in block 1030. If block 1030 is answered with YES at some point in the iteration, the process jumps to a block 1140, wherein the reduction parameter b is set to zero. In the three-operands operation represented in block 950 in FIG. 18, the result is that no modulus is added or subtracted, which means that the intermediate result of Z was so small that no modular reduction was necessary. In a block 1160, the variable n is then redefined, the reduction shift value $S_N$ being eventually calculated in a block 1180, which reduction shift value $S_N$ is needed, in a block 940 of FIG. 18, to perform the left shift of the modulus so as to achieve a shifted modulus.

In blocks 1200, 1220 and 1240, the current values of n and k are finally examined for further variables MAX and cur_k so as to examine the current definition of the N register to ensure that no register overshoot takes place. The further details are not relevant to the present invention but are described more fully in DE 3631992 C2.

The algorithm represented in FIGS. 18 and 19 may be implemented in terms of hardware, as is shown in FIG. 10. For the three-operands operation to be performed in block 950, an arithmetic unit 700 is required, which unit is designated as AU in FIG. 10. The latter is coupled to a register C 710 for the multiplicand, to a register N 720 for the modulus, and to a register Z 730 for the current intermediate result of the modular multiplication. It may further be seen from FIG. 10 that the result of the three-operands operation is re-fed into the Z register 730 via a feedback arrow 740. FIG. 10 also shows the interconnection of the registers. The value ZDN calculated in block 1020 of FIG. 19 must be stored in a ZDN register 750 of its own. The ZDN comparison and/or the iteration loop presented in FIG. 19 is further process-controlled by a designated control logic 760 for the ZDN comparison.

The main work of the ZDN algorithm for calculating Z:=M×C mod N therefore consists in the following two operations:

1. Calculation of the shift values $s_z$ and $s_i$ for registers Z and N, so that the following equation is met:

$$2/3 N \times 2^{-si} < |Z| \leq 4/3 N \times 2^{-si} \text{ and}$$

2. Calculation of the three-operands sum:

$$Z := 2^{sz} Z + a\, C + b \times 2^{sz-si} N$$

Multiplication-lookahead parameter a and reduction-lookahead parameter b may, as is known, take on values of −1, 0 and +1.

It shall be pointed out that the intermediate result Z, the multiplicand C and the modulus N of long numbers, i.e. numbers whose numbers of digits and/or bits may easily be larger than 512, it being possible that these figures have up to more than 2048 digits.

The known method described above for performing the modular multiplication also comprises the following three-operands addition, which has been slightly altered, of the following form:

$$N := N * 2^{sn}$$

$$Z := Z * 2^{sz} + v_c * C + v_n * N.$$

In the above equations, $s_z$ designates the shift value of the intermediate result Z, as is calculated from the known Booth method, i.e. from the multiplication-lookahead method. $s_n$ designates the shift value of N calculated as set forth above.

In a practical implementation, the shift values $s_z$ and $S_n$ must not be infinitely high, especially as shifters for shifting long numbers are provided for this purpose, which may only accomplish a bit shift, in a long-number register, to a maximum shift value. In this manner, a shift value $s_z$ of between 0 and 5 is made possible in a cryptography processor operating in accordance with the known ZDN method. With regard to the shift of the modulus, a shift value between −3 and +3 is used.

The limited shift values have the drawback that, e.g., the shift value $s_z$ for shifting the intermediate result Z from a previous iteration step is often too small for a current iteration step. To be precise, this is the case if the multiplication-lookahead algorithm establishes that the nature of the multiplier is such that, for example, a shift value larger than 5 is possible. This applies if, depending on the lookahead rule, e.g. more than 5 subsequent zeros come up in the multiplier. If it is contemplated that the multiplier M has 1024 or even 2048 bits, this situation may easily occur relatively frequently. Due to the limited shift value, the known ZDN method will react, in this "special case", by performing a three-operands operation, to be precise with the maximum shift value, however by setting the multiplication-lookahead parameter $v_c$ to 0, i.e. by not adding anything to the multiplicand in this step. In the next iteration step, a new multiplication shift value $s_z$ is calculated, which, if it is larger than the maximum shift value $S_{zmax}$, is again limited by the maximum shift value, which again leads to a degenerated "three-operands addition", wherein the multiplicand is again not added, i.e. wherein only the shifted intermediate result as well as the shifted modulus are added taking into consideration the sign for the modulus.

It may be seen from the above consideration that in such a special case, when the multiplication-lookahead algorithm would permit a large shift, same cannot be implemented with maximum efficiency, which is due to the limited shift magnitude $S_{zmax}$.

The known ZDN method is therefore not capable of making use of the full increase in efficiency of the multiplication-lookahead method. In order to achieve an increase in efficiency, a shifter enlargement would have to be performed in the known ZDN method, which shifter enlargement, however, leads to the fact, in particular in integrated circuits for chip cards, that more chip area is needed, which is not always tolerable due to tight chip area specifications furnished by chip-card manufacturers, and/or which may lead to considerable price rises.

It shall be pointed out at this stage that in particular in the field of cryptography processors, there is an extremely competitive market where even small price differences will lead to one provider surviving while another provider will not survive. This is due to the fact that processors for chip cards are a mass product, since chip cards are typically manufactured in large numbers.

On the other hand, there are considerable security demands placed on chip-card processors, since chip cards are typically in the hand of users, i.e. also in the hand of attackers which are in full control of the chip-card processor to be attacked. Therefore, security demands placed upon cryptography algorithms are more and more on the increase, which may be seen, for example, in the fact that for increasing the security of the RSA algorithm, the operands are now not only required to have a length of, e.g., 1024, but have to be 2048 bits long.

Nevertheless, the overall area taken up by the processor is preset by the chip-card manufacturer. This means that a manufacturer of chip-card processors must accommodate on a preset area calculating units and memories requiring a large amount of space. By contrast, cryptography algorithms which are more and more complicated also need more and more working memory, so that an enlargement of a calculating unit to the effect that, for example, a larger shifter is installed, is often not tolerable for this reason. That is, if more chip area were attributed to the calculating unit, i.e., for example, to a shifter, a smaller amount of working memory could, in turn, be implemented on the specified chip area, which in turn leads to the fact that certain highly complicated cryptography algorithms cannot be performed at all and/or are slower in terms of calculation than when they are performed and implemented by products of competitors.

SUMMARY OF THE INVENTION

It is an object of the present invention to provide a more efficient concept for calculating a multiplication.

In accordance with a first aspect, the present invention provides an apparatus adapted for calculating a multiplication of a multiplier and a multiplicand with regard to a modulus by means of an iteration method having several iteration steps within a cryptographic calculation, the multiplier, the multiplicand and the modulus being parameters of the cryptographic calculation, the apparatus having: an examiner for examining digits of the multiplier for a current iteration step by means of a multiplication-lookahead algorithm so as to obtain a multiplication-lookahead shift value; a determinator for determining an intermediate-result shift value larger than zero, so that an intermediate result which stems from an iteration step preceding the current iteration step and is shifted toward more significant bits by the intermediate-result shift value has a most significant bit, whose significance is closer to a significance of a most significant bit of the modulus than is a most significant bit of the intermediate result from the preceding iteration step; a calculator for calculating a multiplicand shift value as a difference between the intermediate-result shift value and the multiplication-lookahead shift value; and a processor for performing a three-operands operation using an intermediate result shifted in accordance with the intermediate-result shift value, a multiplicand shifted in accordance with the multiplicand shift value, and the modulus, so as to obtain an intermediate result for the current iteration step.

In accordance with a second aspect, the present invention provides a method performed in an apparatus adapted for calculating a multiplication of a multiplier and of a multiplicand with regard to a modulus by means of an iteration method having several iteration steps, the method being performed within a cryptographic calculation, the multiplier, the multiplicand and the modulus being parameters of the cryptographic calculation, the method with the steps of: examining digits of the multiplier for a current iteration step by means of a multiplication-lookahead algorithm so as to obtain a multiplication-lookahead shift value; determining an intermediate-result shift value larger than zero, so that an intermediate result which stems from an iteration step preceding the current iteration step and is shifted toward more significant bits by the intermediate-result shift value has a most significant bit, whose significance is closer to a significance of a most significant bit of the modulus than is a most significant bit of the intermediate result from the preceding iteration step; calculating a multiplicand shift value as a difference between the intermediate-result shift value and the multiplication-lookahead shift value; and performing a three-operands operation using an intermediate result shifted in accordance with the intermediate-result shift value, a multiplicand shifted in accordance with the multiplicand shift value, and the modulus, so as to obtain an intermediate result for the current iteration step.

In accordance with a third aspect, the present invention provides a computer program having a program code for performing, if the program runs on a computer, the method performed in an apparatus adapted for calculating a multiplication of a multiplier and of a multiplicand with regard to a modulus by means of an iteration method having several iteration steps, the method being performed within a cryptographic calculation, the multiplier, the multiplicand and the modulus being parameters of the cryptographic calculation, the method with the steps of: examining digits of the multiplier for a current iteration step by means of a multiplication-lookahead algorithm so as to obtain a multiplication-lookahead shift value; determining an intermediate-result shift value larger than zero, so that an intermediate result which stems from an iteration step preceding the current iteration step and is shifted toward more significant bits by the intermediate-result shift value has a most significant bit, whose significance is closer to a significance of a most significant bit of the modulus than is a most significant bit of the intermediate result from the preceding iteration step; calculating a multiplicand shift value as a difference between the intermediate-result shift value and the multiplication-lookahead shift value; and performing a three-operands operation using an intermediate result shifted in accordance with the intermediate-result shift value, a multiplicand shifted in accordance with the multiplicand shift value, and the modulus, so as to obtain an intermediate result for the current iteration step.

BRIEF DESCRIPTION OF THE DRAWINGS

These and other objects and features of the present invention will become clear from the following description taken in conjunction with the accompanying drawing, in which:

FIG. 5 shows a flowchart of the concept of modulus transformation;

FIG. 6 shows a sub-division of a modulus N into a first portion $N_T$ of bits and into a second portion $N_R$ Of bits;

FIG. 7 shows the sub-division of the transformed modulus $N^T$ into a first section of digits of the length L ($N^T$), and the remaining digits;

FIG. 8 is a representation of the digits of the 2/3-fold of the transformed modulus $N^T$;

FIG. 9 is a schematic representation of the digits of the transformed modulus with randomization;

FIG. 10 is a schematic representation of a calculating unit for performing the modular multiplication with modulus transformation;

FIG. 12 is a variable definition of a computer program in accordance with the present invention;

FIG. 13 is a representation of auxiliary functions for the inventive method;

FIGS. 14*aa* and 14*ab* show initializing indications for a method in accordance with a preferred embodiment;

FIG. 14*b* is a program-like representation of an embodiment of the inventive method with a shift of the multiplicand and with a parallel calculation of the lookahead parameters in the current iteration step for the next iteration step;

FIG. 15 is a more detailed program representation of the three-operands addition used in FIG. 14*b*;

FIG. 16*a* is a more detailed representation of the lookahead-modulo function used in FIG. 14*b*;

FIG. 16*b* is a more detailed representation of the post-processing_lookahead-modulo function used in FIG. 14*b*;

FIG. 17*a* is a more detailed representation of the lookahead-multiplication function of FIG. 14*b*;

FIG. 17*b* is a more detailed representation of the post-processing_lookahead-multiplication function;

FIG. 18 is a flowchart representation of the known ZDN method; and

DESCRIPTION OF THE PREFERRED EMBODIMENTS

Figure 1:
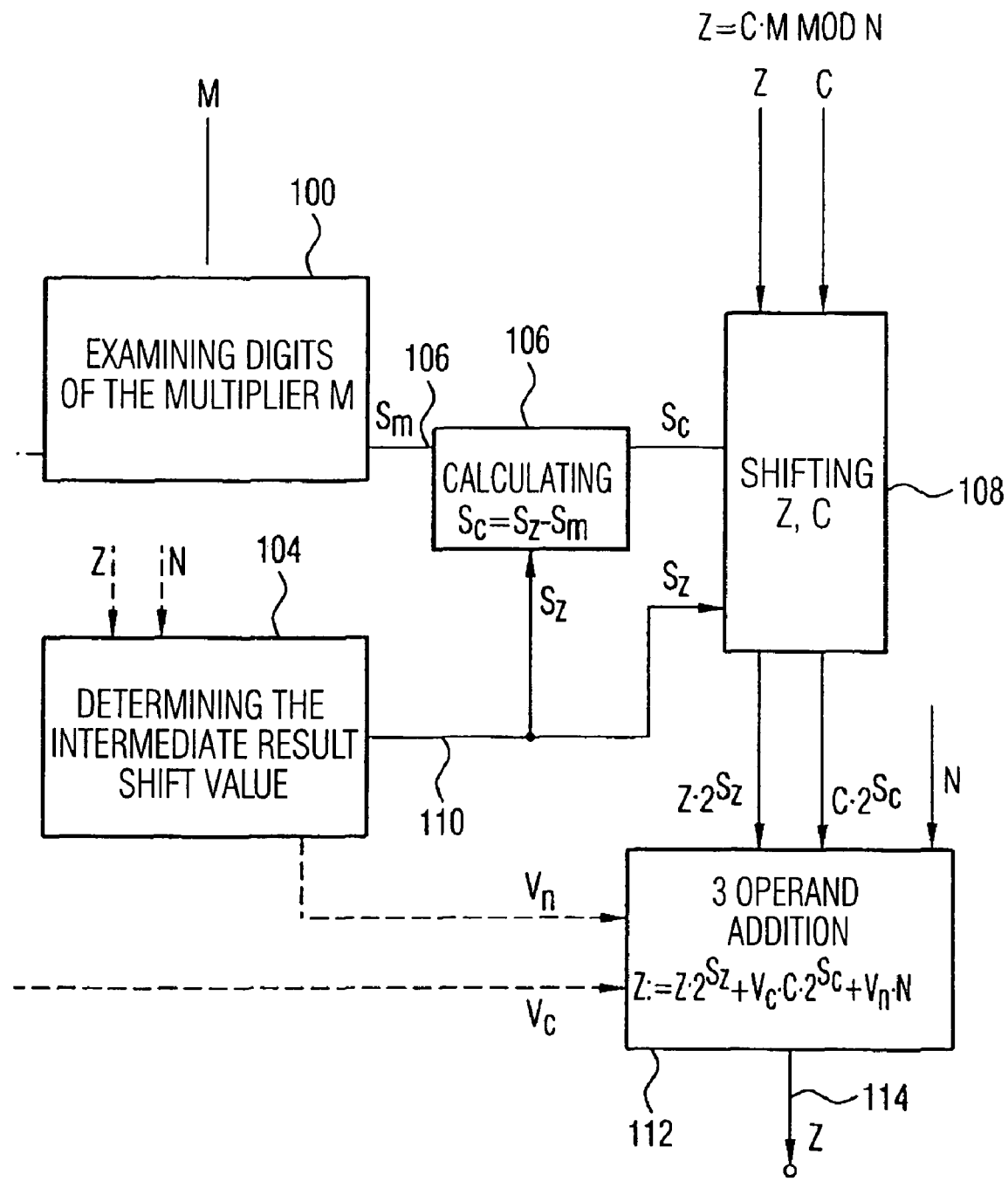
FIG. 1 is a block diagram of an inventive apparatus for calculating a multiplication with a shift of the multiplicand.

The present invention is based on the finding that existing shifter resources may be made use of more fully if the modulus is retained at a predetermined position in its modulus register and/or if the multiplicand C is shifted relative to the modulus, instead of retaining the multiplicand C, which is in a firm position in the known ZDN method. As will be set forth below, this results in the fact that the shift value calculated by the multiplication-lookahead algorithm, which shift value will be referred to as $s_m$ below, does not immediately lead to a shift of a parameter, but is combined with another shift value, to be precise with the shift value for the multiplicand C, by means of a difference. This means that the multiplication shift value $s_m$ determined by the known Booth method is no longer directly used for shifting the intermediate result by this amount, as is done in the known ZDN method, but must be realized by the shifter in a manner in which it is reduced by the shift value by which the multiplicand C, which, in accordance with the invention, is held variable, is shifted in its register.

According to the invention, a new algorithm thus results, wherein the three-operands addition to be performed in an iteration step is calculated as follows:

$$C := C * 2^{s_c}$$

$$Z := Z * 2^{s_z} + v_c * C + v_n * N$$

The multiplicand shift value $s_c$ is calculated from a difference between the intermediate-result shift value $s_z$ and the multiplication-lookahead shift value $s_m$, to be precise in accordance with the following equation:

$$s_c = s_z - s_m$$

Since the intermediate-result shift value $s_z$ is always larger than 0, as will be explained below, the multiplicand shift value $s_c$ is always smaller, in terms of its amount, than the multiplication shift value $s_m$, which leads to the fact that the potentially large multiplication-lookahead shift value $s_m$ from the known Booth method is not "absolutely domineering" with regard to the requirement placed upon shifters provided in a circuit, but has an impact which is reduced, in terms of amount, by the value of the intermediate-result shift value $s_z$.

For existing calculating units with existing shifter resources, the inventive concept allows the sum of both shifters to be used in the modular multiplication phase, and allows the long shifter to be used in the reduction phase. This splitting into short and long shifters thus corresponds exactly to the requirements made in practical use, wherein a reduction is to be performed as fast as possible, i.e. wherein a large shifter is required, at the end of the modular multiplication.

In addition, the inventive concept is capable of taking on, with an existing shifter capacity, relatively large shift values of the multiplication-lookahead algorithm, such that fewer special cases occur and so that thus the performance of the multiplication-lookahead algorithm may be implemented as well as possible.

The inventive apparatus includes means for examining digits of the multiplier for a current iteration step by means of a multiplication-lookahead algorithm to obtain a multiplication-lookahead shift value $s_m$. In addition, the means for determining an intermediate-result shift value $s_z$ larger than 0 are provided, so that an intermediate result, shifted toward more significant bits by the intermediate-result shift value $s_z$, from an iteration step preceding the current iteration step, has a most significant bit whose significance is closer to a most significant bit of the modulus than is a most significant bit of the intermediate result from the preceding iteration step. In addition, means for calculating a multiplicand shift value $s_c$ as a difference between the intermediate-result shift value $s_z$ and the multiplication-lookahead shift value $s_m$ are provided. Furthermore, means for shifting the intermediate result by the intermediate-result shift value, and for shifting the multiplicand by the multiplicand shift value $s_c$ with regard to the modulus are provided so as to obtain a shifted intermediate result and a shifted multiplicand.

The three-operands addition is performed using the shifted intermediate result, the shifted multiplicands and the modulus, so as to obtain an intermediate result for the current iteration step.

There are several possibilities of determining the intermediate-result shift value $s_z$. An optimum behavior, i.e. processing at maximum speed, is achieved if the intermediate result is shifted by a maximum in each case, i.e. such that the MSB of the shifted intermediate result equals the MSB of the modulus, since then a good reduction is always obtained, i.e. the current intermediate result becomes, in terms of its amount, as small as possible after the three-operands operation. An efficiency reduced in comparison therewith is achieved by selecting the intermediate-result shift value $s_z$ not to be maximum, but by selecting it in an approximated manner in the sense of a more or less pronounced estimation, or by limiting it by the length of the intermediate-result shifter. In principle, an increase in performance is achieved already if the intermediate-result shift value $s_z$ is selected to be larger than 0. To be precise, the multiplicand shift value $s_c$ is smaller, in terms of amount, than the multiplication-lookahead shift value $s_m$, so that the value $s_m$ is no longer absolutely domineering and does no longer dictate the dimensioning of the shifter.

In a preferred embodiment, the modulus is aligned in a left-justified manner in the modulus register so as to reserve as large an underflow buffer as possible, so that the multiplicand may be shifted into the underflow buffer by the maximum amount possible with regard to an existing register.

In a preferred embodiment of the present invention, a modulus transformation as has been disclosed in DE 10111087 A1 is also used.

For a further increase in efficiency, it is preferred, in an embodiment of the present invention, to perform a three-operands addition which has been slimmed, as it were, and has degenerated into a two-operands addition, in parallel with the actual three-operands addition so as to calculate an approximated intermediate result which is obtained faster than the actual intermediate result of the current step. In parallel with calculating the exact intermediate result of the current step, the lookahead parameters for the next step may then be calculated on the basis of the approximated intermediate result for the current step. If the large and complicated calculating unit has thus calculated, for performing the three-operands addition, the intermediate result for the current step, the lookahead parameters for the next step are preferably already present at this point in time, so that the three-operands calculating unit may, immediately after completing the last iteration step, start calculating the exact intermediate result for the current iteration step. Thus, the calculation of the lookahead parameters for the next step is performed in parallel with the calculation of the exact intermediate result for the current step on the basis of an approximated operand addition, which is a "slimmed" version of an approximated three-operands addition.

In a further embodiment of the present invention it is preferred to combine the modulus transformation and the parallel calculation of the lookahead parameters for the next iteration step, since in this case, the calculation of the approximated intermediate result is highly simplified and thus considerably accelerated due to the upper bits of the modulus which are specified by the modulus transformation and are known in advance.

FIG. 1 shows a block diagram of the inventive apparatus for calculating a multiplication of a multiplier M and a multiplicand C with regard to modulus N by means of an iteration method comprising several iteration steps. It shall be pointed out that the multiplier, the multiplicand and the modulus may be integers or polynomials.

As has been explained with reference to FIG. 18, multiplication concepts are iterative concepts, in particular in cryptographic calculations, in so far as a multiplication is calculated using several iteration steps which are performed, in principle, identically. FIG. 1 shows the means and/or sub-steps that may be involved in performing an iteration step.

Specifically, FIG. 1 includes means 100 for examining digits of the multiplier M with regard to the current iteration step by means of a multiplication-lookahead algorithm so as to obtain a multiplication-lookahead shift value $s_m$ at an output 102 of means 100.

In a preferred embodiment of the present invention, the multiplication-lookahead algorithm is a known Booth algorithm, which, if it implements several lookahead rules, produces also a multiplication-lookahead parameter $v_c$ in addition to a multiplication-lookahead shift value $s_m$. Moreover, it is not necessary to explicitly calculate a lookahead parameter if the multiplication-lookahead algorithm applies only one or a limited number of lookahead rules, such that thus—provided there are sufficiently large shifters—the sign parameter $v_c$ always equals "+1". For other lookahead rules, however, the case that the sign parameter $v_c$ equals −1 may also arise. If too large a multiplication-lookahead shift value $s_m$ has been obtained, the case that the multiplication-lookahead parameter $v_c$ equals 0 may also arise.

The apparatus shown in FIG. 1 further includes means 104 for determining the intermediate-result shift value $s_z$, which means are, in principle, configured such that they determine an intermediate-result shift value larger than 0, the intermediate-result shift value resulting in the fact that an intermediate result to be processed has, if it has been shifted by the intermediate-result shift value $s_z$, a most significant bit (MSB) whose significance is closer to a significance of the most significant bit of the modulus than is a most significant bit of the intermediate result from the preceding iteration step. In other words, this means that the intermediate-result shift value $s_z$ causes the intermediate result to be shifted to the left by at least one digit if, in a register, the more significant bits are arranged on the left and the less significant bits are arranged on the right.

It shall also be pointed out at this stage that a most significant bit (MSB) is a bit in a register which carries useful information. For example, if a number is smaller than the register length would allow, and if the number is aligned to the right in the register, the number will have a most significant bit placed somewhere in the register. Above the MSB of this number, there could possibly be zeros in the register, which, however, carry no significant information. "Most significant bit" therefore is understood to mean that bit of a number which has the highest significance, compared to the other bits of the number, and at the same time carrying useful information.

In a specific embodiment, means 104 for determining the intermediate-result shift value $s_z$ are configured to shift the intermediate result as far to the left as possible, such that the MSB of the shifted intermediate result has the same significance as the MSB of the modulus. In this case, a modulus subtraction, i.e. a reduction, will lead to a significantly smaller new intermediate result after a three-operands addition. Therefore, this situation is aimed at, since in this case, a reduction is always performed well, fast and efficiently. Means 104 for determining the intermediate-result shift value, however, are already effective when producing an intermediate-result shift value $s_z$ larger than 0.

The inventive apparatus further includes means 106 for calculating a multiplicand shift value $s_c$ equaling the difference between the intermediate-result shift value $s_z$ and the multiplication-lookahead shift value $s_m$. From the equation in block 106 of FIG. 1 it may be seen that an intermediate-result shift value greater than 0 already leads to the fact that the multiplication shift value $s_m$ no longer is absolutely domineering and no longer determines the shifter dimension, but that the multiplication shift value $s_m$ is already reduced in terms of its amount in the event that $s_z$ is larger than 0.

The apparatus shown in FIG. 1 further includes means 108 for shifting the intermediate result Z by the intermediate-result shift value $s_z$ provided both to means 106 and to means 108 by means 104 via an output 110. The means for shifting are further configured to shift the multiplicand C by the multiplicand shift value $s_c$ to obtain a shifted multiplicand.

The apparatus shown in FIG. 1 furthermore includes means 112 for performing a three-operands addition using the shifted intermediate result, the shifted multiplicand and the modulus, the latter being fixed, so as to obtain an intermediate result for the current iteration step, which intermediate result is output at an output 114 of the three-operands adder 112.

It shall be pointed out at this stage that the shifting means 108 and the three-operands adder 112 do not necessarily have to be implemented as separate means, but that the shifting of an operand, i.e. the multiplication of the operand by $2^s$, need not necessarily by performed in terms of hardware, i.e. by actual register shifting, but may also be achieved, in principle, in terms of software, by multiplying by $2^s$. In this case, means 108 and 112 are combined into a single means performing the functionality of the multiplication and subsequent addition in accordance with the equation set forth in block 112 of FIG. 1.

Figure 2:
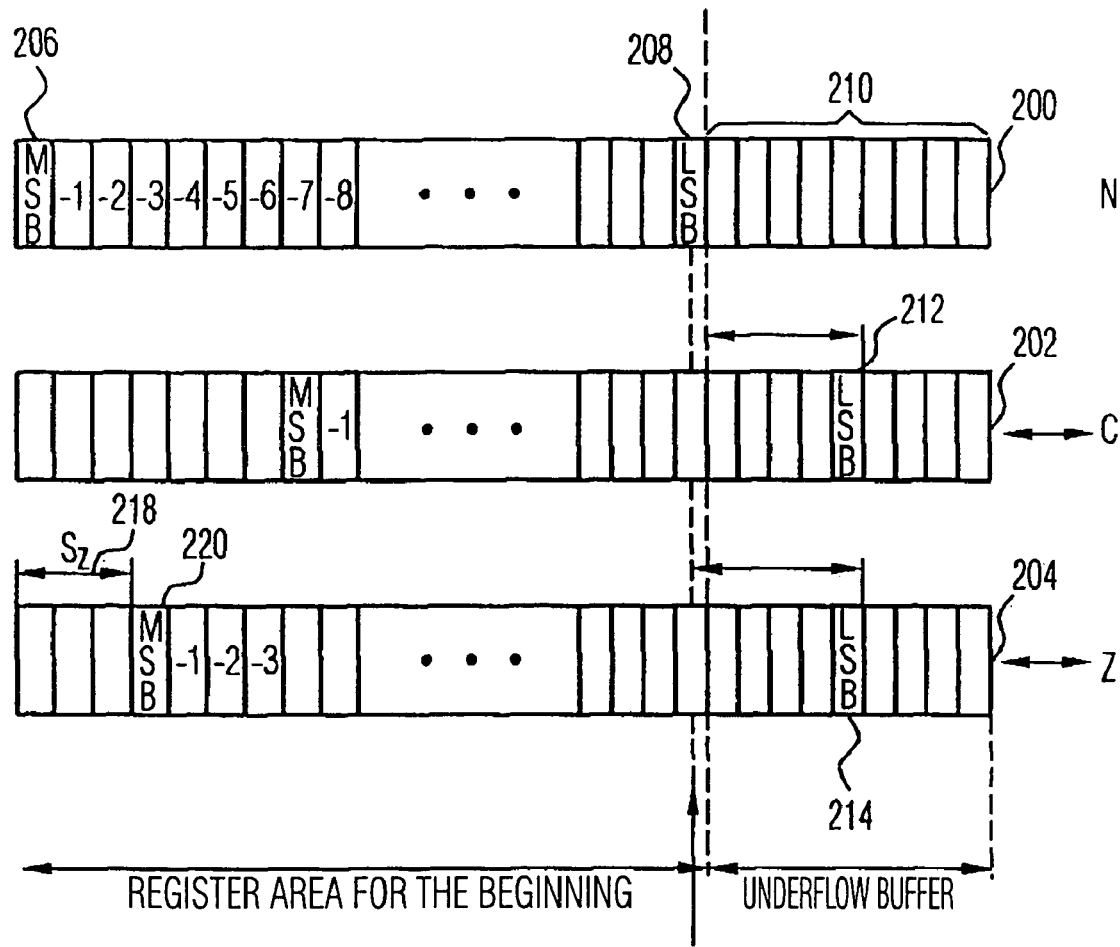
FIG. 2 shows a register definition of registers N, C and Z with a left-justified modulus alignment.

FIG. 2 shows a schematic representation of the three relevant registers, i.e. the modulus register N 200, the multiplicand register C 202 and the intermediate-result register Z 204.

In the event of a shift of the multiplicand in the multiplicand register 202, modulus N is fixedly entered in the modulus register 200. In addition it is preferred to enter modulus N in a left-justified manner in the modulus 200, so that a most significant bit (MSB) is entered in the most significant register digit which is indicated on the very left-hand side of FIG. 2 and is designated by 206. Bits MSB −1, MSB −2, MSB −3 etc. of modulus N then follow in the adjacent register cells, up to a least significant bit (LSB) 208 of the modulus. The modulus N, which is either the normal modulus used, for example, in an RSA calculation, or which, as will be explained below, preferably is a transformed modulus, is fixed in the modulus register 200 during the entire iterative calculation. By contrast, the multiplicand C and the intermediate result Z, using the shifting means and/or corresponding shifters, are variable in their registers 202, 204, as is indicated by the dual arrows next to the registers. FIG. 2 shows a typical situation in any iteration step in the calculation of a multiplication of a multiplier M and of the multiplicand C with regard to modulus N. It may be seen from FIG. 2 that multiplicand C has already been shifted to the right by 5 bits, i.e. has been shifted into the underflow buffer 210. It can also be seen that the very intermediate-result register is defined such that the current intermediate result could be shifted upwards by 3 bits.

In the embodiment shown in FIG. 2, modulus N is always arranged left-justified in the modulus register 200. Depending on the bit length of the modulus N, the LSB 208 of modulus N can be positioned anywhere in the modulus register. The bits 201 below the LSB 208 of modulus N in the modulus register then define the underflow buffer into which the multiplicand C may move.

Below, the concept of shifting the multiplicand C is compared to the known ZDN algorithm, wherein multiplicand C was constant. While in the prior ZDN method, by analogy with the step-wise multiplication of two binary numbers, orthodox mathematics has, in principle, been followed, wherein the intermediate result has been shifted to the left by the multiplication-lookahead shift value, and wherein the modulus then has also been shifted upwards to achieve an efficient reduction in each iteration step, the inventive method also moves, as it were, the comma with regard to its placement in the register. This is effected by shifting the multiplicand C, which defines the comma, as it were.

In a preferred embodiment with a shift of a multiplicand, the value Z in the intermediate-result register 204 is always shifted as high up as possible so that a reduction may take place. In the case shown in FIG. 2, a shift value $s_z$ 218 (3 bits) would be selected for the next iteration step, so that the MSB 220 of the current Z value in the Z register 204 becomes, in its order, the same as the MSB 206 of the modulus. If the modulus N is then subtracted from the register Z, the difference will be relatively small, since the numbers are about equal in amount. At this point it shall be pointed out that a calculation may be just as well effected with positive as with negative numbers.

As has been represented with regard to FIG. 1, an examination of digits of the multiplier M for the current iteration step is performed in the next step so as to find out which multiplication-lookahead shift value $s_m$ is admitted. It may be seen from FIG. 1, block 106, that the shift value $s_c$ of the multiplicand register 202 is then determined from $s_z-s_m$.

If, for example, the multiplication-lookahead algorithm determines that the multiplication shift value $s_m$ is 3, i.e. equals $s_z$ 218, a multiplicand shift value $s_c$ equaling 0 is calculated. If this result is compared to the known ZDN algorithm, it can be seen that in this case, $s_z$ has been selected such as is allowed by the Booth algorithm. Therefore, no shift in the comma, i.e. no shift in the multiplicand C, need take place.

Below, attention shall be paid to the case where $s_m$ is smaller than $s_z$, i.e. is only 2 in the example shown in FIG. 2, whereas $s_z$ 218 equals 3. In comparison with the known Booth algorithm, this means that the intermediate result has actually been shifted upwards one bit too far. This means that Z is too large for the addition with Z by the factor of 2, i.e. a shift by a register digit. To compensate for this, the multiplicand C is now also shifted upwards by one bit in accordance with the new method. In other words this means that the comma defined by C and/or the LSB 212 of C is adjusted to the selected Z shift value $s_z$ 218. After shifting C upwards by one bit and/or by the value of $s_c$, the relationship between C and Z is clear again, and an error-free addition may take place in block 112 of FIG. 1.

In addition, due to the fact that $s_z$ has been selected to be as large as possible, an efficient reduction will also take place in the three-operands addition in block 112 of FIG. 1, since Z has about the same order of magnitude as N, which is achieved already by shifting by $s_z$ 218, and since a multiplicand C has also been added, so that the numbers N and Z have a similar order of magnitude at any rate.

Below, consideration shall be given to the case where $s_m$ is larger than $s_z$. As has been explained, it is preferred to select $s_z$ 218 to have a maximum value. A larger value for $s_z$ three bits in FIG. 2 is not possible, since in this case, the MSB 220 of Z would "fall out" out the register 204.

If the Booth algorithm determines the value of $s_m$ to be larger than $s_z$, the intermediate-result value has not been shifted upward far enough, e.g. by one bit too few, in the iteration method described in FIG. 2. This means that, for the three-operands addition, Z is too small as compared with C if no countermeasures are taken. To counteract this situation, multiplicand C therefore is also shifted to the right, by, e.g., one bit in accordance with the difference between $s_z$ and $s_m$, so that the relationship between C and Z is right again. In this case, too, there is again a good reduction, since Z has an order of magnitude of N due to the fact that it has been shifted upwards by a maximum amount, so that the difference between Z and N is again a relatively small number, i.e. that a good reduction has taken place within the three-operands addition in block 112 of FIG. 1.

Figure 3:
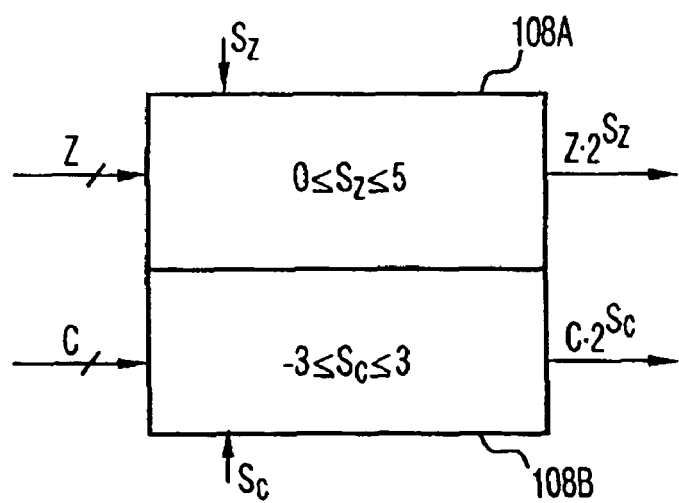
FIG. 3 is a detailed representation of the two shifters with limited shift values.

The concept shown in FIG. 2 therefore has two essential advantages with regard to the utilization of existing shifter resources. Such a shifter for shifting Z and C, as could be implemented in the shifting means 108 of FIG. 1, is shown in FIG. 3. The shifter schematically includes a first shifter part 108a for shifting Z, and a second shifter part 108b for shifting C. The first shifter part 108a is a shifter that can only shift in a positive direction. It is used for shifting Z. This goes to show that the LSB 214 of Z can never be shifted into the underflow buffer 210. FIG. 2, however, shows the case occurring after a three-operands addition, which is why the LSB 212 of C and the LSB 214 of Z have the same valency, since due to the three-operands addition, the LSB 214 is determined by the LSB of all operands involved in block 112 of FIG. 1, irrespective of the amount Z has been shifted upwards prior to this three-operands addition. Since N is fixed, and C may be shifted downwards, C always determines the LSB of Z after a three-operands addition. If Z were, as has been described, always shifted to the left by $s_z$ 218, the LSBs 212 and 214 of C and Z would diverge prior to the three-operands addition, so as to coincide again after the three-operands addition. Since $s_m$ is always positive, as the multiplier is not processed at once in the opposite direction, but is processed from less significant towards higher significant bits, and since $s_z$ is always positive, the amount of $s_c$ is always smaller than $s_z$, so that the LSB of Z is always determined by C.

The large shifter 108a, which can shift by +5, is therefore used for $s_z$, so that any shifts are always effected to be as close to N as possible due to this large shift value Z. It shall be pointed out at this stage that the case shown in FIG. 2 is not necessarily a typical case. It may also be that Z and N were about equally large in a previous three-operands addition, so that the MSB 220 has a smaller valency than the MSB 206 of modulus N despite a maximum shift to the left. To render this case as rare as possible, the large shifter, which may only shift in one direction, i.e. the shifter 108a, is used for shifting Z. Since the multiplicand C must be shifted in both directions, a shifter having an upwards shifting capacity, i.e. to the left, and a downwards shifting capacity, i.e. to the right, is needed for this multiplicand. Since $s_c$, however, will always be a different of positive numbers, the shifter need not be configured to be large. It has therefore proven that a shifter having a shifting capacity of −3 to +3 is sufficient. Therefore, existing shifting capacities are utilized more efficiently by the new concept with a variable multiplicand C, since the multiplication shift value $s_m$ does never need to be translated directly to a shift (this value tends to be large), and since the large shifter therefore may be used for reduction purposes, mainly for shifting Z to be as close as possible to N, so that a good reduction takes place.

It has proven that in an iterative embodiment of the prior ZDN method and also of the new method with a variable multiplicand C, the reduction always slightly "lags behind" as compared with the multiplication.

This has become apparent, in the prior ZDN method, by the fact that after processing all digits of the multiplier M, the modulus N shifted in the prior method was still larger than the original modulus. In other words, in the prior ZDN method, a part of the current modulus was still in the overflow buffer. Therefore, several residual-operands additions needed to be performed, wherein, even though no more multiplier digits needed to be examined, so many three-operands additions needed to be performed with a shifted modulus (modulus shifted to the right) until the MSB of the modulus again migrated out of the overflow buffer and was at the same position in the register where it was at the beginning of the calculation, i.e. prior to the first iteration step. Therefore, the multiplication-lookahead algorithm was typically "finished" already several steps ahead of the reduction of the reduction-lookahead algorithm.

In the new method, this situation also occurs. It is however, not noticed by means of the fact that the modulus is in the overflow buffer. In the new method, the modulus is fixed and may not be shifted, as has been explained. Once all multiplier digits have been processed and once it has been established that the LSB 212 is still less significant than the LSB 208 of the modulus, several further final operand additions need to be performed, to be precise without allowing for multiplier digits, since they have already been processed. Since the multiplier digits have already been processed, the multiplicand C is also no longer needed. Therefore, it no longer needs to be shifted to the "zero line" defined by LSB 208 once all multiplier digits have been processed. Once all multiplier digits have been processed, multiplicand C is of no more interest. LSB 212 of multiplicand C therefore no longer needs to be shifted upwards using the small shifter 108b, which would allow, in one step, only a shift value of 3 to the left, once all multipliers have been processed. Instead, as soon as all multiplier digits have been processed, the multiplicand is of no more interest and is no longer required.

For the final reduction, however, it is of interest where the LSB 214 of the intermediate-result register Z was placed in the underflow buffer 210. Thus, the LSB 212 of the multiplicand C determined the significance of the LSB 214 of the intermediate-result register Z in the last three-operands addition which still contained multiplier digits. A final reduction will still take place until the LSB 214 is placed on the "zero line" defined by the LSB 208 of the modulus register 200. However, now this "shifting upwards" of the Z value in the intermediate-result register 204 takes place with the large shifter 108a which, in the embodiment shown in FIG. 3, allows five shift values, respectively. The final reduction therefore takes place in large steps, whereas in the known method, the final reduction had to be accomplished with the small shifter, since there is was necessary for the modulus N to be returned to its original position. In the new method, however, modulus N is fixed, whereas the comma is coped with by the multiplicand C, which, however, is of no interest for the final reduction, since there are no more multiplier digits. Therefore, the multiplication-lookahead parameter $v_c$ equals zero anyhow, so that for shifting Z upward in the "degenerated" final operand addition, the large shifter Z, which allows a shift of up to 5, may always be used.

In summary, the exemplary shifting means shown in FIG. 3 provide, with a 5-shifter for Z and a −3, . . . , +3 shifter for C, a virtual Booth shifter of a length of 8 (!) and a reduction shifter of a length of 5.

With regard to a detailed description of the new iterative multiplication concept, reference will later on be made in FIGS. 12 to 17b, which represent a preferred embodiment of the present invention in a pseudocode explained in parallel, wherein in this embodiment represented, the new method of shifting the multiplicand C is combined with the concept of modulus transformation and a novel method for calculating, in parallel, the multiplication-lookahead parameters and the reduction-lookahead parameters.

Figure 4:
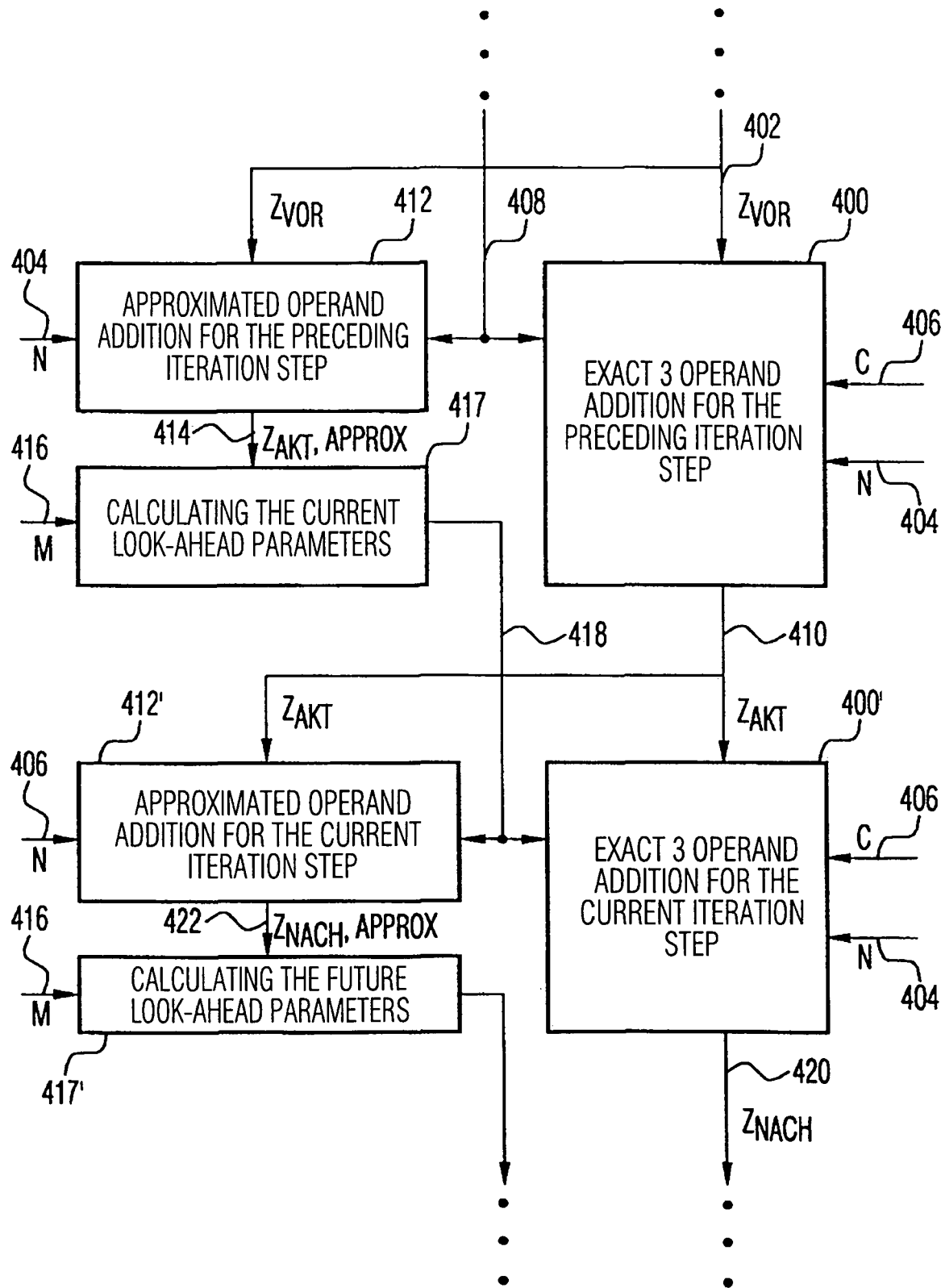
FIG. 4 is a block diagram of the accelerated three-operands addition with a parallel calculation of the lookahead parameters for the next iteration step.

FIG. 4 shows a block diagram of an apparatus for calculating a multiplication of a multiplicand and of a multiplier with regard to a modulus by means of an iteration method having several iteration steps including a previous iteration step and a current iteration step. The apparatus shown in FIG. 4 may be used both to accelerate the calculation of the lookahead parameters $s_m$, $s_c$ and $s_z$ of the novel method described in FIG. 1 having a shiftable multiplicand C, and to calculate the lookahead parameters $s_z$ and $s_n$ of blocks 920 and 940 of FIG. 18, i.e. the lookahead parameters of the known ZDN method.

It shall be pointed out at this stage that, depending on the situation, lookahead parameters are, on the one hand, the shift values, but, on the other hand, they are also the signs for the multiplicand and the modulus, which are determined depending on the lookahead rule and on the situation of the shift values with regard to the available shifters and the size of the available underflow buffer, and may be +, − or 0, as will be set forth later on.

The apparatus for accelerated performance of the iteration method, which is shown in FIG. 4, includes means 400 for performing an exact three-operands addition for the previous iteration step using a previous intermediate result $Z_{vor}$, or $Z_{pre}$, 402, modulus 404, multiplicand Z 406, and previous lookahead parameters, which are provided via a line 408 in the schematic representation of FIG. 4. Means 400 for calculating the exact three-operands addition provide an exact intermediate result for the current iteration step $Z_{akt}$, or $Z_{cur}$, designated by 410 in FIG. 4. The apparatus shown in FIG. 4 further includes means 412 for performing an approximated operands addition for the previous iteration step using the previous intermediate result $Z_{pre}$ and the modulus N 404 and using at least part of the previous lookahead parameters, which are provided by line 408 in FIG. 4, so as to obtain an approximated intermediate result for the current iteration step, which approximated intermediate result is designated by $Z_{cur, approx}$ in FIG. 4. Using the approximated intermediate result 414 for the current iteration step, which does not correspond to the exact intermediate result $Z_{cur}$ 410 but represents an estimation and/or prediction of same, and using the multiplier M 416, the current lookahead parameters are then calculated and output via a line 418. As has been explained, means 417 for calculating the current lookahead parameters also use the current approximated intermediate result 414 as well as the multiplier 416 to calculate the current lookahead parameters 418.

The apparatus shown in FIG. 4 is further effective so that the means for performing the exact three-operands addition are configured to perform an exact three-operands addition in the current iteration step using the exact intermediate result 410 for the current iteration step, using modulus N 404, the multiplicand 406 as well as the current lookahead parameters provided via line 418 from means 417.

These circumstances are schematically shown in FIG. 4, in that means 400' for calculating the exact three-operands addition for the current iteration step are shown, in that means 412' for calculating the approximated operand addition for the current iteration step are shown, and in that means 417' for calculating the subsequent lookahead parameters are shown. In particular, means 412' are configured to perform an approximated operand addition using the current intermediate result 410 and modulus N, so as to estimate the intermediate result Z for the subsequent step, which is calculated in an exact manner by means 400' and is designated by 420, as $Z_{subs, approx}$ 422. Using the value 422, the subsequent lookahead parameters are then calculated at least taking into consideration multiplier M 416. It shall be pointed out that it is preferred, of course, not to provide, for each iteration step, specific means for calculating the exact three-operands addition, specific means for calculating the approximated operand addition, or specific means for calculating the current lookahead parameters, but that a cryptography processor comprise single means 400 for calculating the exact three-operands addition, single means for calculating the approximated operand addition and single means for calculating the lookahead parameters on the basis of an approximated intermediate result. In this case, control means are provided which cause the three means to be fed with the corresponding new input parameters for each iteration step, as may be seen from FIG. 4.

Means 417 (or 417') are configured to comprise the functionalities of means 100, 104, 106 of FIG. 1 for the novel method with the shiftable multiplicand C.

With regard to the prior method, means 417 and/or 417' are configured to comprise the functionalities of means 910, 930, which, as may be seen from FIG. 18, can also be fed with an approximated intermediate result of the previous step rather than with the exact intermediate result of the previous step.

As becomes clear already from the schematic representation shown in FIG. 4, the approximation of the exact intermediate result calculated in the exact three-operands addition allows the calculation of the exact three-operands addition in an iteration step and, in parallel therewith, the calculation of the lookahead parameters for the next iteration step, so that three-operands additions may be performed continuously, as it were, without interrupting the calculation of lookahead parameters.

With regard to FIG. 18 it can be seen that in the prior concept, wherein no approximation of an exact intermediate result has been performed, each iteration loop consisted, in principle, of two serial stages, to be precise of, initially, the calculation of the lookahead parameters for the current iteration step (910, 930) and, subsequently, the calculation of the three-operands addition including all the corresponding shifts (920, 940, 950).

Similarly, the novel concept including a shifting of the multiplicand C could be performed in that blocks 100, 104, 106 are initially effective in an iteration step so as to perform $s_c$ and $s_z$ for the current iteration step, so as to perform, once the lookahead parameters have been calculated, corresponding shifts with means 108, and a three-operands addition with means 112.

This dual-clock behavior, which has entailed considerable losses in performance, is overcome by the acceleration concept shown in FIG. 4, by calculating, in parallel with each other, an exact intermediate result for the current iteration step and calculating the lookahead parameters for the next iteration step as early as in the current iteration step, using an approximated intermediate result.

By means of the acceleration concept shown in FIG. 4, one problem of the prior ZDN method of FIG. 18 and of the novel iteration method having shiftable multiplicands C of FIG. 1 is overcome, the problem being that the shift and sign parameters $s_z$, $s_n$, a, and b of FIG. 18 and/or $s_c$ and $s_z$ as well as $v_c$ and $v_n$ of the novel method of FIG. 1 would have to be calculated first, i.e. prior to a respective three-operands addition. Thus, the adding unit 950 would have been idling in the prior method of FIG. 18, or the adder unit 112 would have been idling in the novel method of FIG. 1 during the calculation of the shift- and sign parameters.

In the acceleration concept of FIG. 4, this problem is overcome by performing a good and a very fast estimation of the currently running three-operands addition. With this approximated value which is early at hand, the lookahead parameters for the next iteration step thus may be calculated within the remaining time. These will then be available when the next three-operands addition starts. Thereby, an acceleration of the method by up to a factor of 2 is achieved.

It has been found, in accordance with the invention, that the future shift- and sign values essentially depend only on the, e.g. 12, upper bits of Z, the multiplicand shift value $s_c$ depending on the multiplier M, i.e. on $s_m$, and on $s_z$ in the novel concept shown in FIG. 1.

In addition, the approximation is based on the fact that the upper bits of Z do not, essentially, depend on C. This is due to the fact that, as has already been explained, the reduction always slightly lags behind the multiplication. Considering the numbers Z, N and C, the consequence of this is that Z is large in comparison with C whenever the reduction lags behind. It is therefore preferred to ignore C for the approximated three-operands addition in block 412, so that the approximated three-operands addition in fact becomes a two-operands addition which is performed, while neglecting C, only with a number of upper bits which is smaller than the total number of bits, such as with the top 12 bits of Z and N, with regard to the below explanation on the significance of the upper bits.

For further acceleration of the approximated three-operands addition, or, generally speaking, of the approximated operands addition in block 412, the modulus N 404 used is not the original modulus, but a transformed modulus which has been transformed, in accordance with the principle of modulus transformation described in DE 10111987 A1, such that a certain number of upper bits, which number varies between 1 and any desired value depending on the modulus transformation, is always the same, irrespective of any modulus actually processed. Since, in the preferred approximated operands addition, only a certain number of bits, starting from the MSB of the modulus register, are taken on anyway, and since a certain number of corresponding bits are taken from the intermediate-result register Z, nothing needs to be taken, in real terms, from the modulus register for the approximated three-operands addition, since the upper bits in the modulus register are known anyhow. The only variable for calculating the approximated operands addition is therefore the sign $v_n$ of the modulus as well as the, e.g., top 12 bits of the intermediate-result register Z. Thus, the approximated operands addition may preferably be configured to be hard-wired in a combinatorial manner such that it may be performed much faster than the exact three-operands addition, so that during the performance of the exact three-operands addition there is still enough time to calculate the lookahead parameters for the next step on the basis of an approximated intermediate result $Z_{approx}$.

Before detailed reference is made to a specific embodiment of means 412 for performing the approximated operand addition, reference will be made below, using FIGS. 5 and 10, to the mode of operation of the modulus transformation, as is disclosed in DE 10111987 A1.

FIG. 5 shows a flowchart of a method for modularly multiplying a multiplicand C by a multiplier M using a modulus N. Initially, modulus N is transformed, in a step 500, to a transformed modulus $N^T$ in accordance with the following equation:

$$N^T = T \times N.$$

In a step 520, the modular multiplication is then processed using the transformed modulus $N^T$ and the predetermined fraction of the transformed modulus, which is 2/3 in the preferred embodiment. In relation to the modular exponentiation this means that an RSA equation of the following form is calculated:

$$C^T := M^d \bmod N^T.$$

Thus, the result of the modular exponentiation C is not calculated in the residual class defined by modulus N, but in the residual class defined by the transformed modulus $N^T$, which is why $C^T$ rather than C appears on the left-hand side of the above equation. Due to the use of the transformed modulus $N^T$, the calculation of the auxiliary-reduction shift value $s_i$, which corresponds to the iteration loop of FIG. 19 of the prior art reduction-lookahead method, is highly simplified here.

In a final step 540, a transformation of $N^T$ back to N is performed by executing an operation which corresponds to the following equation:

$$C := C^T \bmod N.$$

The transformed result $C^T$, which lies in the residual class of the transformed modulus $N^T$, preferably is led back to the residual class of modulus N by a simple shift/subtraction reduction, so that C is the result of the modular exponentiation.

The transformation of modulus N to a transformed modulus $N^T$ using the transformer T from step 500 is performed such that the predetermined fraction of the transformed modulus, i.e., in the preferred embodiment, the 2/3-fold of the transformed modulus, has a more significant digit having a first predetermined value, followed by a less significant digit having a second predetermined value. Thus, the comparison of the intermediate result Z with the 2/3-fold of the transformed modulus can be highly simplified, to be precise by searching the topmost digit of Z, which also has the first predetermined value, and in that the difference between the more significant digit having the first predetermined value of the predetermined fraction of the transformed modulus, and the topmost digit of the intermediate result Z having the first predetermined value equals the difference $s_i$.

As a summary, this is represented as follows. Preferably, N is transformed into a transformed modulus $N^T$ in the 32-bits CPU rather than in the crypto-coprocessor, so that the following applies:

$$N^T := T \times N,$$

T being a natural number.

If all numbers used are binary numbers, the following form results for $N^T$:

$$N^T := 1100 \ldots 0\, XX \ldots XX$$

The following value then results for the 2/3-fold of the transformed modulus:

$$2/3 N^T = 100 \ldots 0\, X'X' \ldots X'X'$$

It can be seen from $N^T$ and 2/3 $N^T$ that both have a first portion of, e.g., 16 bits, and, subsequently, a portion of L(N) bits X and/or X'. For the so-called ZDN comparison, only the top 16 bits of the 2/3-fold of the transformed modulus $N^T$ are used, since this already provides an error probability better than about $2^{-10}$. This means that not all of the 512, 1024 or 2048 bits of the 2/3-fold of the transformed modulus must be used for the ZDN comparison, but rather it is sufficient to perform this comparison with the top 16 bits of the transformed modulus. Of course, fewer bits of 2/3 $N^T$ may be used for the comparison, but then the error probability gradually increases. However, since the errors are not critical and only lead to a less than optimum behavior of the reduction-lookahead method, this path may readily be followed.

Thus, the 2/3-fold of the transformed modulus $N^T$ has a more significant digit having the value 1, which is followed by at least one less significant digit having a value 0, i.e. a second predetermined value. In the embodiment described above, the number of less significant digits is 15. Of course, larger or smaller numbers may also be used here, depending on the differences in magnitude between the intermediate result Z and the 2/3-fold of the transformed modulus $N^T$ to be expected and/or to be processed. For the amount of the intermediate result Z of the modular multiplication, i.e. of the result of the three-operands addition in block 950 of FIG. 18, the following form results:

$$|Z| = 00 \ldots 01 YY \ldots Y$$

The auxiliary shift value $s_i$ is calculated in accordance with the following equation:

$$2/3 N^T \times 2^{-s_i} < |Z| \leq 4/3 N^T \times 2^{-s_i}.$$

Due to the topology of the 2/3-fold of the transformed modulus $N^T$, the value $s_i$ is always the distance between the most significant bit with a 1 of the 2/3-fold of the transformed modulus $N^T$, and the most significant 1 of the amount of the intermediate result.

This difference in digits, and/or the value of $s_i$ may be determined in a trivial manner. No more iteration will be required.

In addition, no more ZDN register will be required to store the 2/3-fold of the modulus, since, by definition, at least the top, e.g. 16, bits of the 2/3-fold of the transformed modulus $N^T$ always have the same form. No more bit comparator will be required. The valency difference of the most significant digit of 2/3-fold of the transformed modulus $N^T$ with a "1" and the most significant digit of Z with a "1" may be readily performed, for example, by bit-wise XORing the register for the transformed register and the register for the intermediate result Z. $s_i$ then equals the difference of the valency of the position where the XORing outputs a first "1" and where the XORing outputs a second "1".

Due to the fact that no ZDN register and no ZDN comparator are required, the entire calculating unit may be accommodated on a smaller chip area.

Figure 19:
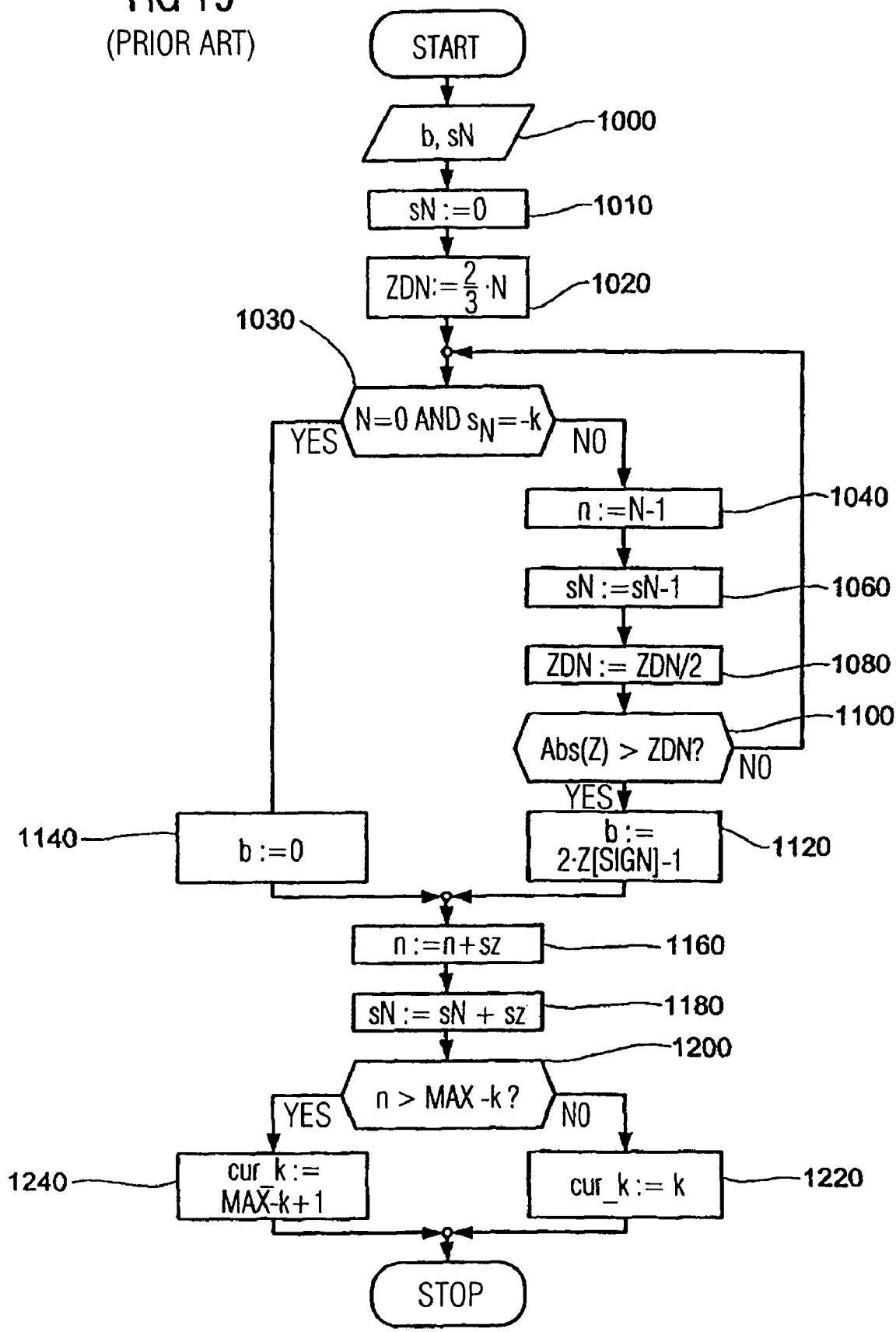
FIG. 19 is a flowchart representation of the known multiplication-lookahead method.

Moreover, the crypto-control part, i.e. the control logic for the ZDN comparison (760 in FIG. 10), is less complex, since the expensive iteration loop of FIG. 19 need not be performed. Finally, the calculation is faster, so that no more timing problems arise for the entire algorithm from the calculation of the auxiliary shift value $s_i$.

The preferred transformation will be considered in more detail below with reference to FIGS. 6 to 9.

As has already been explained, an essential part of the ZDN algorithm consists in meeting the following equation:

2/3 $2^{-s_i}$N<|Z|≤4/3 $2^{-s_i}$N.

$s_i$ is referred to as the auxiliary shift value and is the shift value which is required to shift Z, in terms of digits, to the same position as N. In the prior art, comparison operations of |Z| with 2/3 N have been necessary for calculating $s_i$.

The comparison with 2/3 is simplified by transforming the modulus to the transformed modulus $N^T$, the transformed modulus $N^T$ being larger than N, prior to performing any modular operation with N. Subsequently, all calculations modulo $N^T$ are performed. However, since the result of the calculation must be in the residual class N, a final reduction with N is still performed.

As is shown in FIG. 6, N shall be an integer with a length of N bits. Since modulus N is always a positive integer, i.e. MSB=0 in the two-complement representation, the sign bit always equals 0, and the second most significant bit (MSB −1) of the modulus N always equals 1. For the ZDN comparison, it is not required to compare all bits of the modulus with all bits of the intermediate result, but it is sufficient to use a number of m bits for the ZDN comparison. The most significant m bits of modulus N define a first part of modulus $N_T$, whereas the remaining N-m bits of the modulus define a second part $N_R$ of the modulus. In a preferred embodiment, m equals 16. Of course, larger or smaller values of m are also possible.

As is shown in FIG. 7, the transformation is performed such that the transformed modulus $N^T$ is 16 bits longer than the original modulus of FIG. 6.

For the ZDN comparison it is sufficient to use the first 16 bits of $N^T$, only 12 bits, for example, being used for the comparison, whereas the 4 least significant bits represent a buffer for potential carry-overs that may stem from even less significant bits.

In this case, the probability of the comparison providing an incorrect result is smaller than $2^{-12}$. If the comparison provides an incorrect result, only a less than optimum reduction shift value $S_N$ is created, the result modulo N, however, is still correct.

If the modulus is used in the two-complement representation, as in FIG. 6, modulus N may be broken down as follows:

$N = 2^{n-m}N_T + N_R$.

Now, N is transformed into $N^T$ using the transformer T, T being a suitably selected integer, which must be so for reasons of congruency. $N^T$ should have the form shown in FIG. 7, i.e. the most significant bit (MSB) of $N^T$ must equal 0, since $N^T$ is supposed to be a positive integer. As will be explained below, the second most significant bit and the third most significant bit of the transformed modulus must equal 1, whereas all other bits of the top portion of the transformed modulus $N^T$, which is designated by reference numeral 33 in FIG. 7, should have a value of "0". Only in this case does it result for the 2/3-fold of $N^T$ that the top portion of the 2/3-fold of $N^T$ has only one bit with a "1", as is shown in FIG. 8, whereas all other bits in the top portion 44 equal "0", so that the trivial comparison already described may be performed to determine $s_i$.

Initially, however, consideration will be given to the calculation of the transformed modulus $N^T$ using the transformer T. The following definition shall apply:

$$N^T = TN = T(2^{n-m}N_T + N_R)$$

The following shall apply for transformer T:

$$T = \left\lfloor \frac{2^{p-2} + 2^{p-3}}{N_T} \right\rfloor$$

using equation 17, the following results for the transformed modulus $N^T$:

$$N^T = \left\lfloor \frac{2^{p-2} + 2^{p-3}}{N_T} \right\rfloor (2^{n-m}N_T + N_R)$$

$$N^T = (2^{n+p-m-2} + 2^{n+p-m-3})\frac{N_T}{N_T} + (2^{p-2} + 2^{p-3})\frac{N_R}{N_T}.$$

If, for example, typical value are taken/used for p and m, i.e. p equals 32 bits and m equals 16 bits, the following results for $N^T$:

$$N^T = 2^{n+14} + 2^{n+13} + N_R \frac{2^{p-2} + 2^{p-3}}{N_T}.$$

It shall be pointed out that the calculation of $N^T$ is preferably performed in the host CPU rather than in the crypto coprocessor. The host CPU includes a short-number calculating unit which is, however, sufficient for calculating $N^T$. Since T must be an integer and since the calculations are performed modulo $N^T$ instead of modulo N within the cryptoprocessor, $N^T$ being larger than N, it is only the first p−m=16 bits of $N^T$ that are relevant for the trivial ZDN comparison in order to calculate the auxiliary shift value $s_i$. The other n bits of $N^T$ can be any number and are not relevant to calculating the auxiliary shift value si, i.e. to the comparison with Z. Of course, however, all bits of the transformed modulus $N^T$ are required for the three-operands addition, which is now performed using the shifted transformed modulus rather than using the shifted modulus.

For the values selected for m and p, the transformer T is a 16-bit integer. This is why the division required for calculating T, and/or required for calculating $N^T$, need only be performed for the 32 most significant bits, and can therefore be programmed on the host CPU in a fast and simple manner.

FIG. 8 shows the 2/3-fold of the transformed modulus $N^T$. Since MSB-1 and MSB-2 of $N^T$ equal "1", as is shown in FIG. 7, and as the following applies:

$(11)_2=(3)_{10}$ and $(2/3\times3)_2=(2)_{10}=(10)_2$, a simple bit pattern results for the 2/3-fold of the transformed modulus $N^T$, the length of the 2/3-fold of the transformed modulus $N^T$ equaling n−m+p.

Due to the special form of 2/3 $N^T$, the comparison with |Z| now becomes very simple. It is known that the most significant one of a 2/3 $N^T$ is at a position n+p−m−2 at the beginning of a modular operation. A pointer for the register Z then starts, in a preferred embodiment, at the MSB of Z and searches for the first "1" of Z. If the MSB of Z equals 1, Z is a negative number, and a search is performed, instead, for the first zero of Z. The difference in the bit position of the first one in register N and in register Z determines the auxiliary shift value $s_i$.

Since the result of the modulo operation must be in the residual class N, an end reduction modulo N is performed, i.e. a back-transformation (step 540 in FIG. 5) must be performed.

The transformation from N to $N^T$ has the same advantages in comparison with the prior art ZDN comparison:

Instead of calculating 2/3 N within the crypto-coprocessor, a simple transformation of N to $N^T$ may be performed in the host CPU.

No ZDN register and no comparator logic are required on the chip, which is why the chip size becomes smaller and the complexity of the coprocessor decreases.

Eventually, the transformation of N to $N^T$ may be combined with a randomization of modulus N, as is shown with regard to FIG. 9. If R is a random number of a length of s bits, the randomized transformed modulus $N^T$ has the form shown in FIG. 9. By means of the randomization number N, the randomized transformed modulus is s bit longer, i.e. has a length increased by the number of R's digits, in comparison with the case where no randomization has been performed (FIG. 7).

In terms of equations, this may be expressed as follows:

$$N^T = TN = T(2^{n-m}N_T + N_R)$$

The randomized transformer T then is expressed as follows:

$$T = \left| \frac{2^{p-2} + 2^{p-3} + R}{N_T} \right|$$

Thus, the following expression results for the randomized transformed modulus:

$$N^T = \left| \frac{2^{p-2} + 2^{p-3} + R}{N_T} \right| (2^{n-m}N_T + N_R)$$

$$N^T = (2^{n+p-m-2} + 2^{n+p-m-3} + R2^{n-m})\frac{N_T}{N_T} + (2^{p-2} + 2^{p-3} + R)\frac{N_R}{N_T}.$$

If 144 bits are used for p, 16 bits are used for m and 112 bits are used for s, the following value results for the transformed modulus $N^T$, including randomization:

$$N^T = 2^{n+126} + 2^{n+125} + R2^{n-16} + N_R\frac{2^{144} + 2^{143} + R}{N_T}.$$

The bit length of $N^T$ will then be as follows:

$L(N^T)=n+p-m=n+m+s=n+16+112=n+128$ bits

FIG. 10 shows a calculating unit which no longer has a ZDN register, but merely an arithmetic unit 700, a C register 710, an N register 720 and a Z register 730, N register 720 now no longer having the modulus and/or a shifted modulus stored therein, but the transformed modulus and/or a shifted transformed modulus, or a randomized transformed modulus or a shifted randomized transformed modulus.

Figure 11:
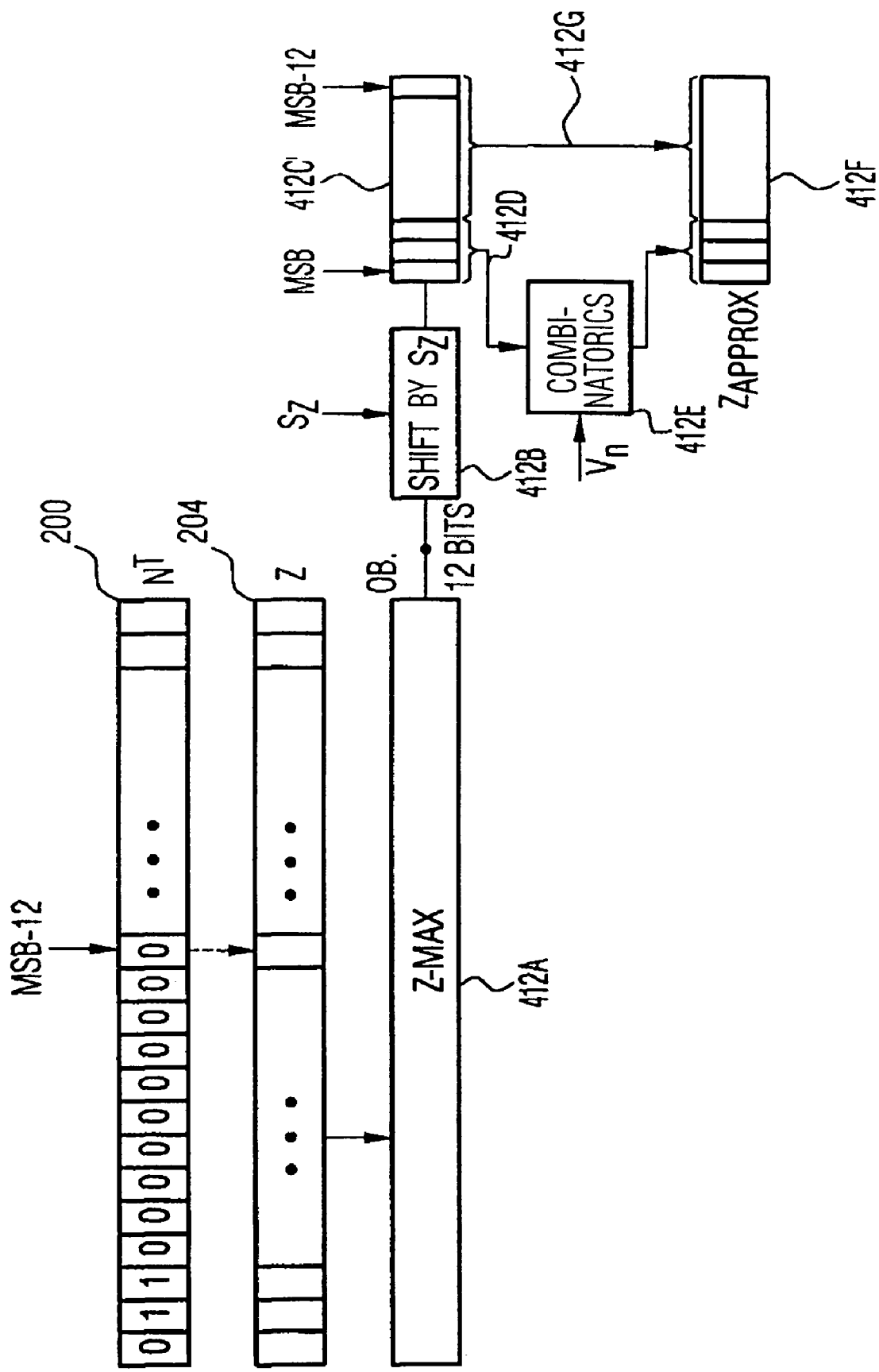
FIG. 11 is a schematic representation of an implementation of the means for performing an approximated operand addition.

A specific embodiment of a circuit for calculating an approximated operand addition for an iteration step will be represented below with reference to FIG. 11. FIG. 11 shows again the modulus register 200 as well as the Z register 204. FIG. 11 shows the case of the transformed modulus, whose upper bits are known, in accordance with FIG. 7, as 011000 . . . 000, for example up to the bit having the significance MSB-12, irrespective of which modulus actually underlies a calculation. For calculating the approximated three-operands addition, the multiplicand C is initially ignored. In addition, only the top 12 bits of Z are read out from the Z register 204, for example by means of a special Z multiplexer 412a. Subsequently, these top 12 bits are shifted to the left by $s_z$ by means of a small shifter 412b. The result is thus an approximated shifted Z value which is symbolically designated by an intermediate register 412c. It shall be pointed out that the storing of this value may be accomplished only for a very short time, so that no specific register needs to be provided, but so that a bus, on which the corresponding bits are transmitted, is sufficient. Due to the fact that the modulus is known and that only the top three bits and, in particular, only the second and third bits of the modulus are a 1, since the modulus is the transformed modulus, whereas the remaining bits are a 0, only the top three bits of the shifted last intermediate result are required, as is indicated by a selection 412d. These three bits are fed into a combinatorial circuit 412e, into which the sign of modulus $v_n$ is also fed, whereas the top three bits of the modulus, i.e. "011", are hard-wired in the combinatorial unit 412e. The combinatorial unit 412e then provides the top three bits of the approximated intermediate result, which is, again, indicated as a further intermediate-result register 412f. The other nine bits of the approximated intermediate result may readily be copied down from the intermediate-result register 412c, as is represented by an arrow 412g.

It may be seen from FIG. 11 that, in the event that the transformed modulus is used, only a calculation with three bits needs to be performed, the bits of the "addition partner", however, being already known, except for their sign, so that it becomes clear that the calculation of the approximated intermediate result $Z_{approx}$ may be effected very fast.

It shall be pointed out that it has been found that with Z[L-1, L-12] approximated in such a manner, the shift and sign values for the next iteration step are almost always calculated in an exact manner. In all other cases, where the approximation of Z was too poor or too rough an approximation, less than optimum shift and sign values are obtained. But these less than optimum shift and sign values do not lead to an actual calculating error occurring, but only lead to the fact that for calculating a modular multiplication, more cycles are required than in the optimum case. However, such an increase, i.e. decrease in performance, is substantially smaller than the gain obtained by the parallel execution of an approximated operand addition so as to calculate an approximated intermediate result for an iteration step being considered, so as to determine, while using the approximated intermediate result, the lookahead parameters for the next iteration step already in parallel with calculating the exact intermediate result.

The means for calculating an approximated intermediate result may further be implemented with small expenditure in terms of chip area, so that a near doubling of the speed of the calculating unit is obtained at the mere price of a very small "expense" of chip area.

With regard to FIGS. 12 to 17b, reference will be made below to a preferred embodiment, wherein the multiplicand is shifted and the modulus is fixed, wherein an acceleration of the method is employed using a calculation of an approximated intermediate result $Z_{approx}$, and wherein a modulus transformation is also used for further acceleration.

FIGS. 12 to 17b represent a flow-chart illustration, as it were, of the inventive method in the form of an intuitive pseudocode. FIGS. 12 to 17b further show that the inventive concept may not only be implemented in hardware, but also in software, depending on the circumstances. The implementation may be effected on a digital storage medium, in particular on a disk or CD with control signals that may be read out electronically and which may cooperate with a programmable computer system in such a manner that the inventive method is performed. Generally speaking, the invention thus also consists of a computer-program product having a program code, stored on a machine-readable carrier, for performing the inventive method if the computer-program product runs on a computer. In other words, the invention may thus be realized as a computer program having a program code for performing the method if the computer program runs on a computer.

FIG. 12 shows an overview of the variables used in each case, and of the type the variables exhibit. The variable Csh is defined as 3, as is shown at 108b in FIG. 3, this variable specifying the shifter for the multiplicand C such that a multiplicand shift value $s_c$ of −3 to +3 may be used. The variable Zsh equals 5 and defines, as is shown in block 108a of FIG. 3, the magnitude of the shifter for the intermediate result, i.e. the magnitude the intermediate-result shift value $s_z$ may have. The variable NoZeros defines the number of zeros the transformed modulus $N^T$ has in the register 200, to be precise starting from MSB-12 in FIG. 11 and going upwards. The said variable is defined as the sum of Csh and Zsh in FIG. 12, even though other magnitudes may also be used for this purpose. The variables NoTopBits relates to the total of upper bits of the Z register 204 which are read out from the Z register 204 by the Z multiplexer 412a to calculate an approximated intermediate result $Z_{approx}$. It may be seen from FIG. 12 that variable NoTopBits equals 12, i.e. NoZeros (=8)+4. In FIG. 12, a variable MaxRegBitLength, which specifies the register length of the entire calculating unit, is also specified. This number has been arbitrarily specified as 160 in FIG. 12. Alternatively, this number could evidently also be 1024, 2048 or be significantly higher than 2048, for example, and be, for example, 2304, to provide sufficient area of underflow buffer 210 (FIG. 2) for RSA moduli and also sufficient area for accommodating the transformed modulus, which, as is known, is larger than the normal modulus.

The variable Debug is an output variable which is not of major importance.

With regard to FIG. 13, several auxiliary functions are represented which are required for methods represented in later figures. For example, the function ReturnBit provides the bit at the position i of a number X.

The function SetBit is capable of defining the bit at the position i of a number X by a value specified by "value", i.e. 0 or 1.

The function BitLength is able to calculate the length of a number in a register from an LSB to an MSB. Using the register 204 in FIG. 4, the function BitLength would provide the number of bits present between MSB 220 and LSB 214.

FIG. 14a represents settings/definitions and/or adjustments and initializations for modular multiplication, as is diagrammatically shown in FIG. 1. The external variables have already been explained with regard to FIG. 12.

Variables which are required are defined with regard to their type in block "state of the calculating unit". Thus, variable Z stands for the intermediate result. The variable ApproxZ stands for the approximated intermediate result which is calculated, for example, by block 412 of FIG. 4 and is designated by 414 in FIG. 4. The variable Lsb provides, as it were, the comma of the multiplicand. At the beginning of a calculation, the variable Lsb indicates the length of the underflow buffer 210 in bits, and in the example shown in FIG. 2, it is 9, for example. In the intermediate state shown in FIG. 2, wherein the LSB 212 of the multiplicand has already been shifted into the underflow buffer 210, the variable Lsb would be, e.g., 4 so as to signal that in the underflow buffer, a further downwards shift of the multiplicand by four bits is possible.

The variable cur_lsb changes with each shift of the multiplicand C and limits the shift value $s_c$, as will be illustrated later on. The variable LAccu defines the length of the multiplier in bits. The variable c indicates by how much the multiplicand C has already been shifted downwards. The sum of c and cur-Lsb is thus constant and always corresponds to the length of the underflow buffer 210, which may amount to up to 300 bits and preferably ranges between 30 and 50 bits. It shall be pointed out that this value may vary, as it eventually depends on the magnitude of the numbers involved.

In the block "defining quantities for the three-operands addition", the lookahead parameters which are used in a preferred embodiment of the present invention are defined.

Thus, the variable VZ_C is the sign $v_c$ in block 112 of FIG. 1. The variable VZ_N represents the sign of the modulus $v_n$ in block 112 of FIG. 1. The variable s_Z represents the intermediate-result shift value in block 112 of FIG. 1. Finally, the variable s_C represents the multiplicand shift value as is represented in block 112 of FIG. 1 and is calculated in block 106 of FIG. 1.

The variables in the section "defining quantities for multiplication" refer to the multiplication-lookahead algorithm. Thus, m is the number of the bits being considered by the multiplier, multiplier bits being processed from top to bottom, as is known. As long as m is larger than 0, there are still multiplier bits. The largest value that m may take on is LAccu, i.e. prior to a starting iterative multiplication, where no digit of the multiplier has yet been processed.

The variable LA defines a lookahead rule used, it being possible to use the lookahead rules as have been described in DE 3631992 C2 (in accordance with the U.S. Pat. No. 4,870, 681). The variable s_M is the multiplication shift value $s_m$ as is calculated by block 100 of FIG. 1.

At first, the individual variables are adjusted and initialized using the given magnitudes. In particular, reference shall be made to the variable Lsb which is set by means of the bit length of a modulus N (and/or transformed modulus $N^T$) which is to be processed at that moment. This shows that the underflow buffer is re-initialized for each, e.g., RSA calculation, i.e. for a modular exponentiation with a modulus, depending on a modulus used. It also becomes clear that the modulus is left-justified in the register, which means that a larger underflow buffer is available for smaller moduli as well, and vice versa.

FIG. 14*b* shows, in a pseudocode, the method represented in the form of the block diagram in accordance with FIGS. 1 and 4. The iteration is performed until truncation conditions are met. Truncation conditions include, on the one hand, that m is equal to 0, i.e. that all multiplier digits have been processed, and that c is equal to 0, i.e. that the multiplicand are aligned with the LSB 208 of modulus N (refer to FIG. 2) with regard to an LSB 212 at the end of the entire modular multiplication. Typically, m will initially be equal to 0, whereas later on, i.e. several cycles later, c equals 0, since the reduction, as has been performed, slightly lags behind the multiplication.

Initially, a first function LAModulo is performed, specifically using an approximated intermediate result. The function LAModulo, which will be explained below, thus represents the functionality of means 417, wherein lookahead parameters for the next iteration step are calculated using an approximated intermediate result $Z_{approx}$.

Subsequently, a function post-processing_LAModulo, a function LAMultiplication and a function post-processing_LAMultiplication are performed to generally calculate the multiplication shift value $s_z$ as well as the multiplication-lookahead parameter $v_n$. Corresponding reduction-lookahead parameters $s_z$ and $v_n$ are calculated in the above function LAModulo. The functions LAModulo, post-processing_LAModulo, LAMultiplication and post-processing_LAMultiplication are all performed within means 417, where it is not the lookahead parameters for the current three-operands addition that are calculated, but where the lookahead parameters are already calculated for the next iteration step.

Hereupon, multiplicand C is shifted by the corresponding multiplicand shift value, which corresponds to the functionality of means 108 of FIG. 1 and/or, depending on the definition, of means 400 of FIG. 4 for the exact calculation of the three-operands addition.

Subsequently, the approximated intermediate result is already defined for the next iteration step, so as to then perform an exact three-operands addition with the function ThreeoperandAddition, specifically an exact three-operands addition for the current iteration step. Subsequently, the variables m, c and cur_lsb are adjusted.

As long as the iteration truncation conditions of m equaling 0 or of c equaling 0 are not met, the While loop is cycled through.

In the last "if" loop, if a upper bit of the Z register equals 1, which indicates a negative number, a degenerated three-operands addition is performed, which means that a modulus N having the sign $v_n$ equaling +1 is added to the current (negative) intermediate result, at the end, a positive intermediate result, wherein the bits below the LSB, i.e. the underflow-buffer bits, are truncated, as is effected by the last "div" operation.

The function set forth in FIG. 14*b* will be explained below in more detail. FIG. 15 shows an overview of the function three-operands addition which is performed as is shown in block 112 of FIG. 1. Specifically, it may be seen from FIG. 15 that in the implemented three-operands addition, the shifting of C is performed outside the three-operands addition, whereas the shifting of Z by $s_z$ is performed within the three-operands addition. This has advantages in certain implementations. Alternatively, however, the shifting of C could also be performed within the three-operands addition, or both shifts could be performed outside the three-operands addition.

It shall be pointed out that the modular reduction with the modulus 2MaxRegBitLength only serves to simulate, in terms of software, that a most significant bit of the Z register may—in the event that $s_z$ was selected such that the MSB 220 is level with the MSB 206 in FIG. 2**—prolapse to the very top in an addition operation and in a carry ripple, which, however, is not critical if specific carry handling routines are employed, as is known in the art.

The shift function in FIG. 15 is self-explanatory and shows, in terms of software, how register contents X are shifted either to the left or to the right by a shift value s_X. A shift to the left means, in a binary notation, a multiplication by $2^{sx}$. A shift to the right means a division by $2^{sx}$.

The function LAModulo represented in FIG. 16*a* is effective to calculate the reduction parameters which include, on the one hand, the intermediate-result shift value $s^z$ and, on the other hand, the sign of the modulus VZ_N. As the input variable, Z, N and c are preferred.

Initially, the variable cur_Zsh is set to the minimum of the variable Zsh, i.e. the shifter length of the intermediate-result shifter and c, i.e. the current deviation of the LSB of the multiplicand from the starting LSB 208 in FIG. 2. Hereupon, the approximated three-operands addition is performed, which, in principle, is effected in the same way as the exact three-operands addition, however with the difference that only the top 12 bits and/or the NoTopBits of N are taken, and that in the three-operands addition formula $s_c$ and the sign of C, i.e. $v_c$, are set to 0.

The subsequent 0/1 searcher initially provides the most significant bit of the register Z and then increments the shift value $s_z$ for such time until $s_z$ is smaller than the variable cur_Zsh and, at the same time, does not exceed the maximum register length.

The last case in the if-loop relates to the case not drawn in FIG. 2, i.e. where $s_z$ could be selected to be larger than is allowed by the shifter Zsh, i.e. where the MSB in the Z register 4 is spaced apart from the MSB 206 of the modulus in the modulus register 200 by more bits than would be the case on the grounds of Zsh. In this case, $s_z$ is set to Zsh via cur_Zsh. Since the intermediate result Z here is definitely smaller than modulus N by one or several bits, a reduction in the form of a modulus subtraction of the three-operands addition is suppressed, which is shown by the fact that the reduction-lookahead parameter $v_n$ is set to 0. In this manner, a reduction is suppressed. If, however, a reduction were performed, the intermediate result would be negative and, in particular, have a larger magnitude than before. A suppression of the reduction in the event that the intermediate result Z cannot be fully shifted upward due to a limited shifter length, therefore highly increases the efficiency of the inventive method.

The function post-processing_LAModulo is represented in FIG. 16*b*. If m is larger than 0, i.e. if there are still multiplier digits to be processed, and if $s_z$ is larger than 0, whereas c is smaller than the number of zeros with regard to the transformed modulus, no shift is conducted, but $s_z$ is set to 0. At the same time, a reduction is also suppressed, i.e. the sign $v_n$ is set to 0.

FIG. 17a shows the function LAMultiplication defining the multiplication-lookahead algorithm. At first, the variables cur_Csh and $s_m$ are initialized, as is shown in FIG. 17a. Subsequently, a 0/1 searcher is executed, during which the variable $s_m$ is incremented. If the truncation condition is met without any special situation, the While loop already results in the multiplication shift value $s_m$ calculated in block 100 of FIG. 1. Hereupon, a corresponding special treatment is performed, depending on the lookahead parameter LA, which is compared to bits of the multiplier, so as to set, e.g., the sign $v_c$ of the multiplicand to 0 if, for example, a larger multiplication shift value is possible than is actually allowed by the shifters. In this case, merely an upward shift and a modular reduction are performed, but no multiplicand is added.

FIG. 17b shows the function post-processing_LAMultiplication, wherein the functionality of means 106 is performed, i.e. wherein $s_c$ is calculated from $s_c - s_m$.

If the $s_c$ obtained is larger than the permitted length $C_{sh}$ of the C shifter, $s_c$ is equated with the maximum shifter length, $s_z$ is set such as is shown in FIG. 17b, and the sign of the modulus $v_n$ in the three-operands addition is set to 0 in block 112 of FIG. 1, so that no reduction takes place, since the maximum shift value has not been taken, but instead a shift value $s_z$ which was set in the function post-processing shown in FIG. 17b.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An apparatus implemented in hardware, the apparatus being adapted for calculating a multiplication of a multiplier and a multiplicand with regard to a modulus by means of an iteration method, the apparatus comprising:
    an examiner for examining digits of the multiplier for a current iteration step by means of a multiplication-lookahead algorithm so as to obtain a multiplication-lookahead shift value;
    a determinator for determining an intermediate-result shift value larger than zero, so that an intermediate result which stems from an iteration step preceding the current iteration step and is shifted toward more significant bits by the intermediate-result shift value has a most significant bit, whose significance is closer to a significance of a most significant bit of the modulus than is a most significant bit of the intermediate result from the preceding iteration step;
    a calculator for calculating a multiplicand shift value as a difference between the intermediate-result shift value and the multiplication-lookahead shift value; and
    a processor for performing a three-operands operation using an intermediate result shifted in accordance with the intermediate-result shift value, a multiplicand shifted in accordance with the multiplicand shift value, and the modulus, so as to obtain an intermediate result for the current iteration step,
    wherein the iteration method comprises several iteration steps within a cryptographic calculation, the multiplier, the multiplicand, the modulus and the intermediate result for the current iteration step being parameters of the cryptographic calculation.

2. The apparatus as claimed in claim 1, further comprising a modulus register for storing the modulus, the modulus being aligned in the register such that a most significant bit of the modulus is at a predetermined register position of the modulus register.

3. The apparatus as claimed in claim 2, wherein the predetermined register position is a most significant register position of the modulus register.

4. The apparatus as claimed in claim 2, wherein the modulus register is dimensioned such that it has more memory locations than the modulus has digits, and wherein memory locations of the modulus register which have a lower valency than a least significant bit of the modulus represent an underflow buffer.

5. The apparatus as claimed in claim 1, further comprising a modulus register for storing the modulus, an intermediate-result register for storing an intermediate result for an iteration step, and a multiplicand register for storing the multiplicand,
    wherein the modulus is fixedly arranged in the modulus register, and
    wherein the intermediate result and the multiplicand are shiftable in their registers by a shifter for shifting.

6. The apparatus as claimed in claim 1, further comprising a shifter for shifting the intermediate result and the multiplicand, configured to shift the intermediate result toward higher valencies by a maximum shift magnitude, and to shift the multiplicand toward higher or lower valencies by a maximum multiplicand shift magnitude.

7. The apparatus as claimed in claim 6, wherein a magnitude of the maximum intermediate-result shift magnitude is larger than a magnitude of the maximum multiplicand shift magnitude.

8. The apparatus as claimed in claim 7, wherein the determinator for determining the intermediate-result shift value is configured to make the intermediate-result shift value equal to a minimum from the maximum intermediate-result shift magnitude and a value by which the intermediate result from the preceding iteration step would have to be shifted, so that a significance of the most significant bit of the shifted intermediate result of the preceding iteration step has a valency equal to the most significant bit of the modulus.

9. The apparatus as claimed in claim 6, wherein
    the calculator for calculating the multiplicand shift value is configured to limit a multiplicand shift value to the maximum multiplicand shift magnitude and to adjust, in the event of a limitation, the intermediate-result shift value determined by the determinator, so that the intermediate-result shift value is equal to the multiplication-lookahead shift value plus the maximum multiplicand shift magnitude, and so as to determine, in the event of a limitation, a reduction parameter which causes the processor for performing the three-operands addition to not take into account the modulus in this iteration step.

10. The apparatus as claimed in claim 1,
    wherein the determinator for determining the intermediate-result shift value is configured to make the intermediate-result shift value so large, at the most, that a valency of a most significant bit of a shifted intermediate result of the preceding iteration step is equal to a valency of the most significant bit of the modulus.

11. The apparatus as claimed in claim 10, wherein the determinator for determining the intermediate-result shift value is configured to determine, in the event that the intermediate-result shift value is limited by the maximum intermediate-result shift magnitude, a reduction parameter causing the processor for performing the three-operands addition to not take into account the modulus in this iteration step.

12. A method performed in a hardware apparatus adapted for calculating a multiplication of a multiplier and of a multiplicand with regard to a modulus by means of an iteration method comprising several iteration steps, the method comprising:

examining, by an examiner, digits of the multiplier for a current iteration step by means of a multiplication-lookahead algorithm so as to obtain a multiplication-lookahead shift value;

determining, by a determiner, an intermediate-result shift value larger than zero, so that an intermediate result which stems from an iteration step preceding the current iteration step and is shifted toward more significant bits by the intermediate-result shift value has a most significant bit, whose significance is closer to a significance of a most significant bit of the modulus than is a most significant bit of the intermediate result from the preceding iteration step;

calculating, by a calculator, a multiplicand shift value as a difference between the intermediate-result shift value and the multiplication-lookahead shift value; and performing, by a processor, a three-operands operation using an intermediate result shifted in accordance with the intermediate-result shift value, a multiplicand shifted in accordance with the multiplicand shift value, and the modulus, so as to obtain an intermediate result for the current iteration step, wherein the iteration method comprises several iteration steps within a cryptographic calculation, the multiplier, the multiplicand, the modulus and the intermediate result for the current iteration step being parameters of the cryptographic calculation.

13. A digital storage medium having stored thereon a computer program having a program code for performing, if the program runs on a computer, the method performed in an apparatus adapted for calculating a multiplication of a multiplier and of a multiplicand with regard to a modulus by means of an iteration method comprising several iteration steps, the method comprising:

examining digits of the multiplier for a current iteration step by means of a multiplication-lookahead algorithm so as to obtain a multiplication-lookahead shift value;

determining an intermediate-result shift value larger than zero, so that an intermediate result which stems from an iteration step preceding the current iteration step and is shifted toward more significant bits by the intermediate-result shift value has a most significant bit, whose significance is closer to a significance of a most significant bit of the modulus than is a most significant bit of the intermediate result from the preceding iteration step;

calculating a multiplicand shift value as a difference between the intermediate-result shift value and the multiplication-lookahead shift value; and performing a three-operands operation using an intermediate result shifted in accordance with the intermediate-result shift value, a multiplicand shifted in accordance with the multiplicand shift value, and the modulus, so as to obtain an intermediate result for the current iteration step, wherein the iteration method comprises several iteration steps within a cryptographic calculation, the multiplier, the multiplicand, the modulus and the intermediate result for the current iteration step being parameters of the cryptographic calculation.

14. A system for performing in a hardware apparatus adapted for calculating a multiplication of a multiplier and of a multiplicand with regard to a modulus by means of an iteration method comprising several iteration steps, the system comprising:

a processor;

a memory communicatively coupled to the processor; and software executing in the processor configured to:

a) examine digits of the multiplier for a current iteration step by means of a multiplication-lookahead algorithm so as to obtain a multiplication-lookahead shift value;

b) determine an intermediate-result shift value larger than zero, so that an intermediate result which stems from an iteration step preceding the current iteration step and is shifted toward more significant bits by the intermediate-result shift value has a most significant bit, whose significance is closer to a significance of a most significant bit of the modulus than is a most significant bit of the intermediate result from the preceding iteration step;

c) calculate a multiplicand shift value as a difference between the intermediate-result shift value and the multiplication-lookahead shift value; and d) perform a three-operands operation using an intermediate result shifted in accordance with the intermediate-result shift value, a multiplicand shifted in accordance with the multiplicand shift value, and the modulus, so as to obtain an intermediate result for the current iteration step, wherein the iteration method comprises several iteration steps within a cryptographic calculation, the multiplier, the multiplicand, the modulus and the intermediate result for the current iteration step being parameters of the cryptographic calculation.

15. A hardware apparatus adapted for calculating a multiplication of a multiplier and a multiplicand with regard to a modulus by means of an iteration method comprising several iteration steps, the hardware apparatus comprising:

an examining means for examining digits of the multiplier for a current iteration step by means of a multiplication-lookahead algorithm so as to obtain a multiplication-lookahead shift value;

a determining means for determining an intermediate-result shift value larger than zero, so that an intermediate result which stems from an iteration step preceding the current iteration step and is shifted toward more significant bits by the intermediate-result shift value has a most significant bit, whose significance is closer to a significance of a most significant bit of the modulus than is a most significant bit of the intermediate result from the preceding iteration step;

a calculating means for calculating a multiplicand shift value as a difference between the intermediate-result shift value and the multiplication-lookahead shift value; and a processing means for performing a three-operands operation using an intermediate result shifted in accordance with the intermediate-result shift value, a multiplicand shifted in accordance with the multiplicand shift value, and the modulus, so as to obtain an intermediate result for the current iteration step, wherein the iteration method comprises several iteration steps within a cryptographic calculation, the multiplier, the multiplicand, the modulus and the intermediate result for the current iteration step being parameters of the cryptographic calculation.

16. apparatus as claimed in claim 15, further comprising a modulus register means for storing the modulus, the modulus being aligned in the register means such that a most significant bit of the modulus is at a predetermined register position of the modulus register means.

17. The apparatus as claimed in claim 16, wherein the predetermined register position is a most significant register position of the modulus register means.

18. The apparatus as claimed in claim 16, wherein the modulus register means is dimensioned such that it has more memory locations than the modulus has digits, and wherein memory locations of the modulus register means which have a lower valency than a least significant bit of the modulus represent an underflow buffer.

19. The apparatus as claimed in claim 15, further comprising a modulus register means for storing the modulus, an intermediate-result register means for storing an intermediate result for an iteration step, and a multiplicand register means for storing the multiplicand, wherein the modulus is fixedly arranged in the modulus register means, and wherein the intermediate result and the multiplicand are shiftable in their registers by a shifting means for shifting.

20. The apparatus as claimed in claim 15, further comprising a shifting means for shifting the intermediate result and the multiplicand, configured to shift the intermediate result toward higher valencies by a maximum shift magnitude, and to shift the multiplicand toward higher or lower valencies by a maximum multiplicand shift magnitude.

21. The apparatus as claimed in claim 20, wherein a magnitude of the maximum intermediate-result shift magnitude is larger than a magnitude of the maximum multiplicand shift magnitude.

22. The apparatus as claimed in claim 21, wherein the determining means for determining the intermediate-result shift value is configured to make the intermediate-result shift value equal to a minimum from the maximum intermediate-result shift magnitude and a value by which the intermediate result from the preceding iteration step would have to be shifted, so that a significance of the most significant bit of the shifted intermediate result of the preceding iteration step has a valency equal to the most significant bit of the modulus.

23. The apparatus as claimed in claim 20, wherein the calculating means for calculating the multiplicand shift value is configured to limit a multiplicand shift value to the maximum multiplicand shift magnitude and to adjust, in the event of a limitation, the intermediate-result shift value determined by the determining means, so that the intermediate-result shift value is equal to the multiplication-lookahead shift value plus the maximum multiplicand shift magnitude, and so as to determine, in the event of a limitation, a reduction parameter which causes the processing means for performing the three-operands addition to not take into account the modulus in this iteration step.

24. The apparatus as claimed in claim 15, wherein the determining means for determining the intermediate-result shift value is configured to make the intermediate-result shift value so large, at the most, that a valency of a most significant bit of a shifted intermediate result of the preceding iteration step is equal to a valency of the most significant bit of the modulus.

25. The apparatus as claimed in claim 24, wherein the determining means for determining the intermediate-result shift value is configured to determine, in the event that the intermediate-result shift value is limited by the maximum intermediate-result shift magnitude, a reduction parameter causing the processor for performing the three-operands addition to not take into account the modulus in this iteration step.

* * * * *